(12) United States Patent
Karpov et al.

(10) Patent No.: US 10,201,804 B2
(45) Date of Patent: Feb. 12, 2019

(54) PLATINUM GROUP METAL (PGM) CATALYSTS FOR AUTOMOTIVE EMISSIONS TREATMENT

(71) Applicants: BASF Corporation, Florham Park, NJ (US); Georgia Tech Research Corporation, Atlanta, GA (US)

(72) Inventors: Andrey Karpov, Speyer (DE); David Preli, Brooklyn, NY (US); Knut Wassermann, Princeton, NJ (US); Andreas Sundermann, Bensheim (DE); Sang-IL Choi, Atlanta, GA (US); Ping Lu, Corona, NY (US); Younan Xia, Atlanta, GA (US)

(73) Assignees: BASF Corporation, Florham Park, NJ (US); Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/546,953

(22) PCT Filed: Jan. 29, 2016

(86) PCT No.: PCT/US2016/015741
§ 371 (c)(1),
(2) Date: Jul. 27, 2017

(87) PCT Pub. No.: WO2016/123534
PCT Pub. Date: Aug. 4, 2016

(65) Prior Publication Data
US 2018/0021756 A1  Jan. 25, 2018

Related U.S. Application Data

(60) Provisional application No. 62/109,489, filed on Jan. 29, 2015.

(51) Int. Cl.
*B01D 53/94* (2006.01)
*B01J 23/44* (2006.01)
*B01J 35/00* (2006.01)
*B01J 37/04* (2006.01)
*B01J 37/00* (2006.01)
(Continued)

(52) U.S. Cl.
CPC ............ *B01J 23/44* (2013.01); *B01D 53/945* (2013.01); *B01J 21/04* (2013.01); *B01J 23/40* (2013.01); *B01J 35/006* (2013.01); *B01J 35/0006* (2013.01); *B01J 35/0013* (2013.01); *B01J 35/1014* (2013.01); *B01J 35/1061* (2013.01); *B01J 37/0072* (2013.01); *B01J 37/0211* (2013.01); *B01J 37/0213* (2013.01); *B01J 37/0221* (2013.01); *B01J 37/0236* (2013.01); *B01J 37/04* (2013.01); *B01J 37/16* (2013.01); *B01D 2255/1021* (2013.01); *B01D 2255/1023* (2013.01); *B01D 2255/1025* (2013.01); *B01D 2255/204* (2013.01); *B01D 2255/206* (2013.01); *B01D 2255/2042* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/707* (2013.01); *B01D 2255/9202* (2013.01); *B01D 2255/9207* (2013.01); *B01J 35/002* (2013.01); *B01J 37/0018* (2013.01); *B01J 37/08* (2013.01); *F01N 3/10* (2013.01); *F01N 2570/10* (2013.01); *F01N 2570/12* (2013.01); *Y02T 10/22* (2013.01)

(58) Field of Classification Search
CPC ........ B01J 23/44; B01J 21/04; B01J 35/0006; B01J 35/0013; B01J 35/1061; B01J 35/1014; B01J 37/04; B01J 37/0072; B01J 37/0221; B01J 37/0236; B01D 53/945; B01D 2255/1023; B01D 2255/9202; B01D 2255/9207; B01D 2255/707; F01N 3/10; F01N 2570/12; F01N 2570/10; F01N 3/101; F01N 2570/14; B82B 3/0038; B82B 3/0095; B82Y 40/00
See application file for complete search history.

(56) References Cited

U.S. PATENT DOCUMENTS 9,815,758 B2 * 11/2017 Canos .................... C07C 45/29
2009/0011177 A1    1/2009 Kubo et al.
(Continued)

FOREIGN PATENT DOCUMENTS

CN   103521219 B  * 11/2017  ............ B01J 21/063
FR     2914200 A1  * 10/2008  .............. B01J 23/40
(Continued)

OTHER PUBLICATIONS

International Search Report and Written Opinion for PCT Patent Application No. PCT/US2016/015741, dated May 23, 2016, 12 pages.
Lim, et al., "Shaped-Controlled Synthesis of Pd Nanocrystals in Aqueous Solution," *Adv. Funct. Mater.*, 2009, vol. 19, pp. 189-200.
Xiong et al., "Shape-Controlled Synthesis of Metal Nanostructures: The Case of Palladium" *Adv. Mater.* 2007, vol. 19, pp. 3385-3391.
(Continued)

*Primary Examiner* — Timothy C Vanoy
(74) *Attorney, Agent, or Firm* — Womble Bond Dickinson (US) LLP

(57) ABSTRACT

Catalytic materials for exhaust gas purifying catalyst composites comprise platinum group metal (PGM)-containing catalysts whose PGM component(s) are provided as nanoparticles and are affixed to a refractory metal oxide, which may be provided as a precursor. Upon calcination of the catalysts, the PGM is thermally affixed to and well-dispersed throughout the support. Excellent conversion of hydrocarbons and nitrogen oxides can advantageously be achieved using such catalysts.

21 Claims, 11 Drawing Sheets

(51) Int. Cl.
  *B01J 37/02*  (2006.01)
  *B01J 21/04*  (2006.01)
  *B01J 35/10*  (2006.01)
  *B01J 23/40*  (2006.01)
  *B01J 37/16*  (2006.01)
  B01J 37/08   (2006.01)
  F01N 3/10    (2006.01)

(56) References Cited

U.S. PATENT DOCUMENTS

| | | | |
|---|---|---|---|
| 2011/0015451 A1* | 1/2011 | Witte | B01J 23/38 |
| | | | 568/903 |
| 2011/0033353 A1* | 2/2011 | Siani | B01D 53/944 |
| | | | 423/213.5 |
| 2011/0143933 A1* | 6/2011 | Yin | B01J 23/42 |
| | | | 502/252 |
| 2011/0251055 A1* | 10/2011 | Fu | B01J 37/16 |
| | | | 502/339 |
| 2012/0263633 A1 | 10/2012 | Koplin et al. | |
| 2013/0034472 A1* | 2/2013 | Cantrell | B01D 53/9422 |
| | | | 422/177 |
| 2013/0217566 A1 | 8/2013 | Wang et al. | |
| 2014/0044627 A1 | 2/2014 | Siani et al. | |
| 2014/0140909 A1* | 5/2014 | Qi | B01J 37/0228 |
| | | | 423/212 |
| 2014/0186253 A1 | 7/2014 | Kitagawa et al. | |
| 2015/0141236 A1* | 5/2015 | Yin | B01J 23/42 |
| | | | 502/5 |
| 2016/0038874 A1* | 2/2016 | Yin | B01D 53/945 |
| | | | 423/213.2 |
| 2016/0045867 A1* | 2/2016 | Kearl | B01J 20/06 |
| | | | 423/213.2 |
| 2017/0304805 A1* | 10/2017 | Xu | B01J 23/464 |

FOREIGN PATENT DOCUMENTS

| | | | | |
|---|---|---|---|---|
| JP | 2006 055836 | 3/2006 | | |
| JP | 2007 229594 | 9/2007 | | |
| RU | 2491988 C2 * | 10/2013 | | B01J 23/38 |
| RU | 2583054 C2 * | 5/2016 | | B01J 23/42 |
| WO | WO 2011/017139 | 2/2011 | | |
| WO | WO 2014-045570 | 3/2014 | | |

\* cited by examiner

Example 1.1

Example 1.1

Example 1.2

Example 1.2

Example 1.3

Example 1.3

Example 1.4

Example 1.4

Example 1.5

Example 1.5

Example 1.6

Example 1.6

Example 1.7

Example 1.7

Example 1.8

Example 1.9

Example 2.4

Example 2.5

Example 2.2

Example 2.4

Example 2.9

Example 4 (Comparative)

PLATINUM GROUP METAL (PGM) CATALYSTS FOR AUTOMOTIVE EMISSIONS TREATMENT

CROSS-REFERENCE TO RELATED APPLICATIONS

The present application is a U.S. National Stage of International Patent Application PCT/US2016/015741 filed Jan. 29, 2016 and claims priority to U.S. Provisional Patent Application No. 62/109,489, filed Jan. 29, 2015. The disclosures of each of the applications noted above are incorporated herein by reference in their entirety.

TECHNICAL FIELD

The present invention is directed to catalytic materials for exhaust gas purifying catalyst composites and methods of making and use thereof. More particularly, the invention pertains to platinum group metal (PGM) catalyst composites for the conversion, e.g., of hydrocarbons and nitrogen oxides.

BACKGROUND

Temperature-induced deactivation of catalysts containing platinum group metals (PGMs) such as platinum, palladium, and rhodium is a great challenge facing environmental catalysis today. Historically, in a standard preparation, PGM particles have been deposited on thermally durable metal oxide supports (e.g., alumina ($Al_2O_3$), zirconia ($ZrO_2$), ceria ($CeO_2$), ceria-zirconia composites ($CeZrO_x$) and the like) by impregnating the supports with solutions containing ions of PGMs, wherein the ions were provided by precursors, such as salts of the desired PGM. Impregnation methods typically lead to the formation of PGM particles with an average diameter of less than or equal to about 5 nanometers (nm) on the metal oxide support. Upon hydrothermal aging, these small particles experience fast deactivation. One mechanism of deactivation is the agglomerating of these small PGM particles, leading to agglomerated group of particles with diameters, e.g., of several hundreds of nanometers. Another mechanism of deactivation can be a solid state reaction between small PGM particles and the metal oxide support, forming inactive PGM-support mixed oxides (for example, $RhAlO_3$). Both of these deactivation mechanisms are associated with small PGM particle size, for example, less than or equal to about 5 nm in the initial fresh state.

International Patent Application Publication No. WO 2011/017139 is directed to "preparation of diesel oxidation catalysts via deposition of colloidal nanoparticles," and exemplifies the formation of platinum nanoparticles on a microparticle alumina support material using chemical fixation by pH adjustment. By use of a microparticle alumina support material, the platinum nanoparticles are primarily located on the surface of the support material (largely outside of the pores of the support material). U.S. Patent Appln. Publ. No. 2012/0263633 describes metal oxide support materials containing nanoscaled iron-platinum group metal particles having a particle size from 0.5 nm to 10 nm, wherein at least 70% of the nanoscaled iron-platinum group metal particles are located on an outside surface layer of the metal oxide support material. The nanoscaled particles of this 2012/0263633 reference originated from precursor soluble salts.

There is a continuing need in the art to provide catalytic articles that provide excellent catalytic activity, thermal stability, and/or efficient use of components such as PGM particles.

SUMMARY OF THE INVENTION

The present disclosure describes thermally stable nanoparticles of one or more platinum group metal (PGM) components. As will be detailed further herein, colloidal PGM particles (e.g., nanoparticles) are thermally affixed to refractory metal oxide supports, such as alumina, during formation of PGM-containing catalytic materials and catalyst composites such that the catalytic material is stable under high aging temperatures (e.g., aging temperatures above about 850° C.). The invention thus pertains to platinum group metal (PGM) catalysts whose PGM components(s), for example palladium and/or rhodium, are provided in the form of nanoparticles associated with a refractory metal oxide support (wherein the support material may be provided as a precursor). Upon calcination of the catalyst, the PGM is thermally fixed to the support. Excellent conversion of hydrocarbons and nitrogen oxides is achieved using such catalytic materials.

In a first aspect, the disclosure provides a catalytic material comprising: a porous refractory metal oxide support with an average primary particle size of about 1 nm to about 100 nm as measured by Transmission Electron Microscopy (TEM); and a platinum group metal (PGM) component in nanoparticle form dispersed throughout the support; wherein the average primary particle size of the PGM component is about 10 nm to about 92 nm as measured by Transmission Electron Microscopy (TEM). In some embodiments, both the support and the PGM component may be colloidally delivered and the PGM can be thermally affixed to the support to form the catalytic material. The catalytic material may be effective for conversion of one or more components of an exhaust stream of an internal combustion engine.

The PGM component may comprise platinum (Pt), palladium (Pd), rhodium (Rh), or combinations thereof. In certain embodiments, the PGM-containing catalytic materials disclosed herein may comprise one or more components in addition to the PGM nanoparticles and support material. For example, the catalytic material can optionally further comprise a promoter and/or a stabilizer in an amount of about 0 to about 30% by weight, based on the weight of the entire catalytic material. In some embodiments, the optional promoter and/or stabilizer may be a rare earth oxide (e.g., ceria, lanthana, neodymia, gadolinia, yttria, praseodymia, samaria, hafnia, or combinations thereof), present in an amount in the range of about 0.1% to about 30% by weight, based on the weight of the entire catalytic material. In some embodiments, the optional promoter and/or the stabilizer may be an alkaline earth oxide (e.g., barium or strontium oxide, or combinations thereof) present in an amount of about 0.1% to about 30% based on the weight of the entire catalytic material. The optional promoter and/or stabilizer can be a component of the catalytic material (e.g., wherein the refractory metal oxide support optionally comprises up to about 30% of a promoter, a stabilizer, or both a promoter and a stabilizer) or can be an additional component added to the catalytic material described herein (e.g., added to a slurry comprising the catalytic material).

The catalytic material may, in some embodiments, have a Barrett, Joyner, Halenda (BJH) desorption average pore radius of about 3 nm to about 30 nm as measured by nitrogen-pore size distribution ($N_2$-PSD). The catalytic material may have a BET surface area greater than or equal to about 30 m²/g as measured by nitrogen adsorption isotherm.

The average primary particle size of the PGM nanoparticles in the catalytic materials disclosed herein may remain at about 10 nm to about 92 nm as measured by Transmission Electron Microscopy (TEM) after calcination, e.g., at 550° C. for two hours in air (with the catalytic material starting in a fresh state).

In a specific embodiment, the refractory metal oxide support can optionally be provided in a form that comprises up to about 30% by weight of a promoter and/or a stabilizer. In some such embodiments, the catalytic material BJH desorption average pore radius is about 3 nm to about 30 nm as measured by nitrogen-pore size distribution ($N_2$-PSD); and the PGM component comprises colloidally delivered palladium that is affixed to the support to form the catalytic material. The catalytic material may have a lower deactivation rate than a comparative catalytic material that comprises the PGM as delivered by a salt.

In another aspect, the disclosure provides a catalyst composite for an exhaust stream of an internal combustion engine comprising any catalytic material disclosed herein coated onto a carrier. The catalyst composite may further comprise one or more additional platinum group metals and/or refractory metal oxide supports and/or promoters and/or stabilizers coated onto the carrier in the same or a different layer as the catalytic material.

A further aspect provides an emission treatment system for treatment of an internal combustion engine exhaust stream including hydrocarbons, carbon monoxide, and other exhaust gas components, the emission treatment system comprising: an exhaust conduit in fluid communication with the internal combustion engine via an exhaust manifold; and any catalyst composite disclosed herein.

Provided in a still further aspect is a method for treating exhaust gases, comprising contacting a gaseous stream comprising hydrocarbons, carbon monoxide, and nitrogen oxides with any catalyst composite disclosed herein.

In another aspect, the disclosure provides a method of making a catalytic material, comprising: (a) obtaining PGM nanoparticles; (b) obtaining nanoparticles of a refractory metal oxide support or a precursor of a refractory metal oxide support; (c) preparing an aqueous colloidal solution of the PGM nanoparticles of step (a) and the nanoparticles of the precursor of the refractory metal oxide support of step (b) to form a catalytic material solution; and (d) drying and calcining the catalytic material solution of step (c) to form the catalytic material, wherein the PGM component is thermally affixed to the metal oxide support.

Step (a) may, in some embodiments, comprise: forming an aqueous solution of a salt of a platinum group metal (PGM), a reducing agent, and a surfactant; mixing and heating the aqueous solution, thereby reducing at least a portion of the metal to a zero valance state by action of the reducing agent in the presence of the surfactant and forming an aqueous solution of colloidal PGM nanoparticles; and optionally, purifying and/or concentrating the nanoparticles. The PGM may comprise, e.g., palladium, rhodium, or combinations thereof; the reducing agent may comprise, e.g., ascorbic acid; and the surfactant may comprise, e.g., polyvinylpyrrolidone (PVP).

The reducing agent may comprise, e.g.: ascorbic acid ($C_6H_8O_6$), citric acid, sodium borohydride ($NaBH_4$), ethanol, propanol, diethylene glycol, and/or monoethylene glycol. The surfactant may comprise, e.g.: poly(vinylalcohol), poly(vinylpyrrolidone), poly(ethyleneimine), poly(acrylic acid), carbohydrates, and/or alkali metal citrates.

Upon calcination, the refractory metal oxide support may comprise a high surface area gamma alumina having a surface area of at least about 60 square meters per gram (m²/g) and can optionally comprise up to about 30% by weight of a promoter and/or a stabilizer that comprises a rare earth oxide (based on the total weight of the refractory metal oxide support plus promoter and stabilizer).

Step (b) may, in some embodiments, comprise obtaining a solution of nanoparticles of the refractory metal oxide support or obtaining a colloidal solution of a precursor of the refractory metal oxide support, and cooling and sonicating the colloidal solution of the refractory metal oxide support.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION OF THE INVENTION

Figure 1:
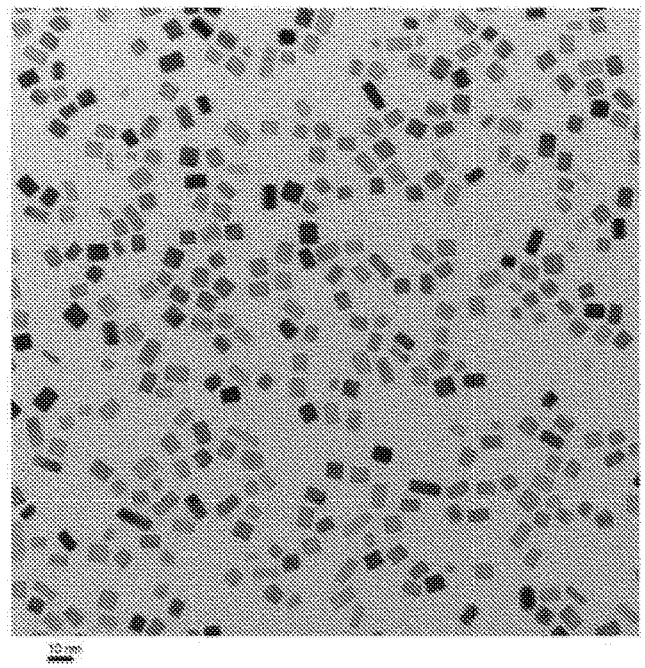
FIGS. 1-2 provide TEM images of the PGM nanoparticles of Example 1.1.

Providing thermally stable platinum group metal (PGM) component particles has a tremendous impact on catalyst performance. Provided herein are colloidal PGM nanoparticles thermally affixed within and to a refractory metal oxide support during formation of PGM-containing catalytic materials and catalyst composites. The PGM nanoparticles are dispersed throughout the support, rather than residing only on a surface layer of the support. The colloidal PGM nanoparticles and the resulting catalytic materials obtained using such PGM nanoparticles as the PGM precursor are particularly suitable for use in high temperature catalytic applications. These PGM nanoparticles can be of various shapes, for example, spherical, cubic, octahedral, or icosahedral and can have an average primary particle size of about 10 nm to about 92 nm, preferably about 10 nm to about 25 nm. Preparation of catalytic material by introducing the PGM component(s) in nanoparticle form during the formation of the support material before final pore sizes are set in the support material results in excellent dispersion of the PGM component(s) within (e.g., in the pores) and on (e.g., on the surface of) the support material. The PGM components are advantageously thermally fixed to the support as well to provide excellent stability.

The following definitions are used herein.

Platinum group metals (PGMs) include palladium (Pd), platinum (Pt), rhodium (Rh), ruthenium (Ru), osmium (Os), and/or iridium (Ir). Other suitable (non-PGM) metals that may provide catalytic activity and that can be incorporated as catalyst components (by traditional processing means or by the methods disclosed herein) include, but are not limited to copper (Cu), silver (Ag), and gold (Au).

A PGM component refers to any component that includes a PGM. For example, the PGM may be in metallic form (having a valence of zero), or the PGM may be in an oxide form. The PGM may be also in a mixed state. For example, the PGM surface may be in an oxide form, whereas the PGM core may be in metallic form. Reference to PGM component allows for the presence of the PGM in any valance state. For example, palladium may be present as $Pd^0$ and/or $Pd^{2+}$, or $Pd^{4+}$. As another example, rhodium may be present as $Rh^0$, $Rh^{1+}$ and/or $Rh^{3+}$.

A PGM nanoparticle is a nanoparticle comprising a PGM component. Typically, such PGM nanoparticles comprise substantially only PGMs (or PGM components) and can thus be described as consisting essentially of or consisting of PGM component(s), e.g., consisting essentially of or consisting of PGMs.

"Thermally affixed" means that a PGM and support combination are heated, e.g., at >250° C., such that the PGM components are partially or completely converted to their oxide forms, resulting in the removal of any organic material present due to the use of precursor compounds, water, and processing aids such as surfactants, and providing a powdered product. Upon use of thermally affixed PGMs on supports in an aqueous (washcoat) slurry, the PGMs are not soluble and do not agglomerate within the slurry. Thermally affixed is different from chemically fixed, where the pH or some other parameter of a dispersion of a PGM salt with support is changed to render the PGM component insoluble in the dispersion.

"Precursor compound" refers to a compound that delivers a desired ingredient. For example, water-soluble, inorganically-based, or organically-based salts may be used for delivery of PGMs and other materials such as alumina, cerium, zirconium, barium, and the like, and are thus considered in some embodiments to be precursor compounds.

"Primary particles" refers to individual particles of material.

"Aggregate" refers to an assembly of primary particles dispersed in a liquid medium.

Reference to "colloidally-delivered" means that during formation of the catalytic material, nanoparticles are used to deliver a component such as platinum group metal (PGM) components and/or support components. In one embodiment, such PGM nanoparticles have an average primary particle size of about 10 nm to about 92 nm as measured by Transmission Electron Microscopy (TEM) (or >about 10 to about 92 nm, or even about 25 to about 92 nm). This is in contrast to the use of ions of PGMs resulting from the use of precursor soluble salts to form catalytic material. Colloidal delivery of PGMs is achieved by forming nanoparticles of PGM components (e.g., PGMs) and optionally purifying and concentrating them.

In one embodiment, the support components have an average primary particle size of about 1 nm to about 100 nm (e.g., about 5 to about 92 nm) as measured by TEM and an average primary aggregate particle size of less than about 500 nm as measured by dynamic light scattering (DLS) on an aqueous dispersions of support components. The support components are preferably dispersible in a liquid medium. Such support components are in contrast to the use of pre-calcined powdered supports such as gamma alumina, which are considered agglomerated particles that are micron-sized or larger dispersed in water. Colloidal delivery of support components may be achieved either by dispersed nanoparticles of the desired support materials themselves or by dispersed nanoparticles of precursor components of the desired support materials.

"Support average pore radius" refers to a characteristic of the support that indicates, on average, the diameter of pore openings within the support. Average pore radius may be measured by $N_2$-PSD (nitrogen-pore size distribution). BJH desorption average pore radius may be measured by nitrogen-pore size distribution ($N_2$-PSD).

"Average primary particle size" refers to a characteristic of particles that indicates on average the diameter of the particles, as measured by TEM.

"Average primary aggregate size" refers to a characteristic of particles dispersed in a liquid medium that indicates, on average, an aggregate particle size measured by light scattering techniques (dynamic light scattering or static light scattering).

"BET surface area" has its usual meaning of referring to the Brunauer-Emmett-Teller method for determining surface area by $N_2$-adsorption measurements. Unless otherwise stated, "surface area" refers to BET surface area.

"Support" in a catalytic material or catalyst washcoat refers to a material that receives precious metals, stabilizers, promoters, binders, and the like through precipitation, association, dispersion, impregnation, or other suitable methods. Examples of supports include, but are not limited to, refractory metal oxides, including high surface area refractory metal oxides, and composites containing oxygen storage components.

"Refractory metal oxide supports" include, e.g., bulk alumina, ceria, zirconia, titania, silica, magnesia, neodymia, mixed oxides (for example $MgAl_2O_4$, $BaAl_{12}O_{19}$, $LaAlO_3$) or doped oxides (for example Ba-doped alumina, Ce-doped alumina, La-doped alumina), doped mixed metal oxides (for example Y—, La—, Pr— or Nd— doped CeZr-oxides), and other materials known for such use. Such materials are considered as providing durability to the resulting catalyst. Refractory metal oxide supports are generally porous.

"High surface area refractory metal oxide supports" refers specifically to support materials (e.g., comprising particles) having BET surface areas of higher than about 30 square meters per gram ("$m^2/g$") and an average pore size larger than about 20 Å. In some embodiments, such support materials can exhibit a wide pore distribution. High surface area refractory metal oxide supports, e.g., alumina support materials, also referred to as "gamma alumina" or "activated alumina," typically exhibit a BET surface area in excess of about 60 $m^2/g$, e.g., often up to about 200 $m^2/g$ or, in some embodiments, even higher. Such activated alumina is usually a mixture of the gamma and delta phases of alumina, but may also contain substantial amounts of eta, kappa and theta alumina phases.

"Rare earth metal oxides" refer to one or more oxides of scandium, yttrium, and the lanthanum series as defined in the Periodic Table of Elements. Rare earth metal oxides are both exemplary oxygen storage components (OSCs) and promoter materials. Examples of suitable oxygen storage components include ceria, praseodymia, or combinations thereof. Delivery of ceria can be achieved by the use of, for example, ceria, a mixed oxide of cerium and zirconium, and/or a mixed oxide of cerium, zirconium, and neodymium. Suitable promoters include one or more non-reducible oxides of one or more rare earth metals selected from the group consisting of lanthanum, praseodymium, yttrium, zirconium and mixtures thereof.

"Alkaline earth metal oxides" refer to Group II metal oxides, which are exemplary stabilizer materials. Suitable stabilizers include one or more non-reducible metal oxides wherein the metal is selected from the group consisting of barium, calcium, magnesium, strontium and mixtures thereof. Preferably, the stabilizer comprises one or more oxides of barium and/or strontium.

"Washcoat" is a thin, adherent coating of a catalytic or other material applied to a refractory substrate, such as a honeycomb flow through monolith substrate or a filter substrate, which is sufficiently porous to permit the passage there through of the gas stream being treated. A "washcoat layer," therefore, is defined as a coating that is comprised of support particles. A "catalyzed washcoat layer" is a coating comprised of support particles impregnated with one or more catalytic components.

Components

Components for catalytic materials are supplied as follows.

While any conceivable salts may be employed as precursor components for platinum group metals (PGMs) (i.e., for the formation of PGM nanoparticles as disclosed herein), it is generally preferred that water-soluble salts are used. As such, one or more precursor compounds may comprise one or more salts selected from the group consisting of nitrates, halogenides, carboxylates, carboxylate esters, alcoholates, and mixtures of two or more thereof. Preferably, the PGM precursor salts are chalogenides or carboxylates, ($C_2$—$C_5$) carboxylate esters, ($C_2$—$C_5$) alcoholates, and mixtures of two or more thereof, and specifically by chlorides or acetates.

Sources of support materials may be any oxide or hydroxide or oxyhydroxide of the desired support material, generally those that are water-dispersible. Alumina, for example, may be provided as a suspension of nano-sized alumina or aluminum oxyhydroxide particles. An exemplary suspension of aluminum oxyhydroxide particles contains boehmite (AlOOH) or pseudoboehmite. The suspension of alumina particles may comprise aluminum oxide, aluminum hydroxide, aluminum oxyhydroxide, or a mixture thereof. Anions such as nitrate, acetate, citrate and formate may coexist in a colloidal alumina suspension. In one or more embodiments, the colloidal alumina is suspended in deionized water at a solids loading of about 5% to about 50% by weight.

Suitable surfactants include, but are not limited to, water-soluble polymers. Molecular weight of polymers is in general in the range from 1,000 to about 500,000 g/mol, more preferably from about 5,000 to about 100,000 g/mol. Polymers include homo- and copolymers, with linear or branched molecular structure. Suitable monomers from which such water soluble polymers may be obtained, comprise unsaturated carboxylic acids and esters, amides and nitriles, N-vinylcarboxyamides, alkylene oxides. Preferred water-soluble polymers are for example selected from poly(vinylalcohol), poly(vinylpyrrolidone), poly(ethyleneimine), poly(acrylic acid), polyaspartic acid, carbohydrates, and/or alkali metal citrates. Examples of water-soluble polymers are provided for example in US 2011/0206753, which is incorporated herein by reference.

Suitable reducing agents include, but are not limited to, alcohols or further alcohol group containing organic molecules. Alcohols include ethanol, propanol, diethylene glycol, monoethylene glycol, and any polyethylene glycol, for example, tetraethylene glycol. Preferred alcohol-containing organic molecules include citric acid or ascorbic acid. Further possible reducing agents comprise inorganic materials such as sodium borohydride ($NaBH_4$) or hydrogen.

Optionally, pH regulators may be used. Suitable pH regulators, if needed, may comprise acetic acid, ascorbic acid ($C_6H_8O_6$), citric acid, oxalic acid ($C_2H_2O_4$), formic acid (HCOOH), chloric acid, sodium hydroxide, and/or ammonium hydroxide.

Suitable mineralizers include, but are not limited to, potassium bromide, sodium bromide, ammonium bromide, tetramethylammonium, cetyltrimethylammonium bromide, and combinations thereof.

Nanoparticle PGM Components

PGM components in nanoparticle form are prepared as follows. A solution comprising a salt of a platinum group metal (PGM), a reducing agent, a surfactant and optionally a mineralizer is prepared. The resulting solution is then mixed and heated to reduce at least a portion of the PGM to a zero valance state by action of the reducing agent in the presence of the surfactant and the optional mineralizer to form a colloidal solution of PGM nanoparticles. In one embodiment, a mixture of a reducing agent, a surfactant and optionally a mineralizer is pre-heated to form an aqueous solution at temperature T1. Then a solution of a salt of a PGM component pre-heated to a temperature T2 is added. A mixture is heated at temperature T3 to reduce at least a portion of the metal to a zero valance form by action of the reducing agent in the presence of a surfactant and optionally a mineralizer to form a colloidal solution of PGM nanoparticles. If nanoparticle PGMs are prepared in water, T1 and T2 are typically about 25° C. to about 100° C. and T3 is typically about 60° C. to about 100° C. If nanoparticle PGM materials are prepared in ethylene glycol, T1 and T2 are typically about 25° C. to about 180° C. and T3 is typically about 100° C. to about 180° C. In one embodiment, the prepared PGM nanoparticles can be used without purification or after purification as seeds for further growth of PGM nanoparticles. Such PGM seeds are added to a solution containing a reducing agent, a surfactant and optionally a mineralizer prior to addition of a solution of a salt of a PGM component. Use of PGM seeds results in general in larger PGM nanoparticles as compared to preparation of PGM nanoparticles without use of PGM seeds.

Choice of PGM precursor (e.g., salt of the PGM component), reducing agent, surfactant and mineralizer will impact the shape and size of the dispersible PGM nanoparticles that are produced. The amount and type of surfactant should be adequate to keep the PGM nanoparticles free of large micron-sized agglomerates as the reducing agent reacts to make zero valance metals. The reducing agent should be present in an amount to reduce all of the metal with a slight amount of excess. Optionally a mineralizer can be added. The optional mineralizer enforces growth of specific PGM facets. During preparation, the salt of the PGM component may be present in the aqueous solution in an amount of about 0.01% to about 2% by weight of the solution, the surfactant may be present in the aqueous solution in an amount of about 0.1% to about 10%, more preferably about 0.1% to about 5%, by weight of the solution, the reducing agent may be present in an amount of about 0.1% to about 10%, more preferably from about 0.1% to about 5%, by weight of the solution, the mineralizer optional mineralizer may be present in an amount of about 0% to about 10%, more preferably about 0% to about 5%, by weight of the solution, the optional PGM seed can be present in an amount of about 0% to about 2%, more preferably from about 0% to about 1%, by weight of the solution.

PGM nanoparticles can be formed in various shapes: spherical, cubic, octahedral, cubooctahedral, or icosahedral.

Catalytic Materials

Catalytic materials are prepared as follows. In one embodiment, PGM nanoparticles and nanoparticles of a refractory metal oxide support or a precursor of a refractory metal oxide support are dispersed in or mixed with water to form an aqueous colloidal solution resulting in a catalytic material solution with an average primary aggregate size of less than about 500 nm. In another embodiment, powder containing nanoparticles of a refractory metal oxide support or a precursor of a refractory metal oxide support can be directly dispersed in an aqueous colloidal solution of PGM nanoparticles to form an aqueous colloidal solution resulting in a catalytic material solution with an average primary aggregate size of less than about 500 nm. PGM nanoparticles may be obtained from an aqueous solution of colloidal PGM nanoparticles, which may be obtained as discussed herein. Nanoparticles of a refractory metal oxide support or a precursor of a refractory metal oxide support may be obtained from a colloidal solution of the refractory metal oxide or the precursor.

The catalytic material solution is dried and calcined to form a catalytic material, wherein the PGM component is thermally affixed within and to the support material.

It is noted that, in some embodiments, the catalytic material can comprise one or more other components in addition to the PGM nanoparticles and support material. For example, common components that can be included in the catalytic materials disclosed herein include promoters and/or stabilizers, as described in further detail herein. In some embodiments, the support is provided wherein the support has been pretreated so as to include up to about 30% of a promoter and/or a stabilizer (e.g., lanthana and/or baria). In some embodiments, the catalytic material contains no promoters and/or stabilizers and, in such embodiments, such components can optionally be added during the preparation of catalyst composites as disclosed herein below.

The content of PGM on the support may be designed as needed for various applications. For catalytic material comprising rhodium on a support such as alumina, the Rh content may be about 0.1% to about 10.0% by weight rhodium in the catalytic material. For catalytic material comprising palladium on a support such as alumina, the Pd content may be about 0.1% to about 20.0% by weight palladium in the catalytic material.

Catalytic materials so formed are prepared as powders where the PGM is affixed to the support. Such powders may then be suspended as further needed in washcoats to prepare catalyst composites.

Catalyst Composites

Once the catalytic materials are prepared, a catalyst composite may be prepared in one or more layers on a carrier. A dispersion of any of the catalytic materials as described herein may be used to form a slurry for a washcoat. The slurry may further comprise any desired additional ingredients such as other platinum group metals, other supports, other stabilizers and promoters, and one or more oxygen storage components.

In one or more embodiments, the slurry is acidic, having a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like.

Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry. As noted herein above, promoters and stabilizers can optionally be incorporated within the support material (i.e., as part of the catalytic material described herein) and/or may be added to the catalytic material (by adding these components to the slurry) during the preparation of catalyst composites.

The slurry may thereafter comminuted to result in substantially all of the solids having particle sizes of less than about 20 microns, i.e., about 0.1 microns to about 15 microns average diameter. The comminution may be accomplished in a ball mill or other similar equipment, and the solids content of the slurry may be, e.g., about 10 to about 50 wt. %, more particularly about 10 to about 40 wt. %. The carrier may then be dipped one or more times in such slurry or the slurry may be coated on the carrier such that there will be deposited on the carrier the desired loading of the washcoat/metal oxide composite, e.g., about 0.5 to about 3.0 g/in$^3$.

Thereafter, the coated carrier is calcined by heating, e.g., at about 500 to about 600° C. for about 1 to about 3 hours.

Typically, when a platinum group metal is desired, a metal component is utilized in the form of a compound or complex to achieve dispersion of the component on a refractory metal oxide support, e.g., activated alumina or a ceria-zirconia composite. For the purposes herein, the term "metal component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. During the calcination step, or at least during the initial phase of use of the composite, such compounds are converted into a catalytically active form of the metal or a compound thereof.

Additional layers may be prepared and deposited upon previous layers in the same manner as described above for deposition any layer upon the carrier.

Carrier

In one or more embodiments, a catalytic material is disposed on a carrier.

The carrier may be any of those materials typically used for preparing catalyst composites, and will preferably comprise a ceramic or metal honeycomb structure. Any suitable carrier may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section.

The carrier can also be a wall-flow filter substrate, where the channels are alternately blocked, allowing a gaseous stream entering the channels from one direction (inlet direction), to flow through the channel walls and exit from the channels from the other direction (outlet direction). A dual oxidation catalyst composition can be coated on the wall-flow filter. If such a carrier is utilized, the resulting system will be able to remove particulate matters along with gaseous pollutants. The wall-flow filter carrier can be made from materials commonly known in the art, such as cordierite or silicon carbide.

The carrier may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

The carriers useful for the catalysts of the present invention may also be metallic in nature and be composed of one or more metals or metal alloys. The metallic carriers may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least about 15 wt. % of the alloy, e.g., about 10 to about 25 wt. % of chromium, about 3 to about 8 wt. % of aluminum and up to about 20 wt. % of nickel. The alloys may also contain small or trace amounts of one or more other metals such as manganese, copper, vanadium, titanium and the like. The surface of the metal carriers may be oxidized at high temperatures, e.g., about 1000° C. and higher, to improve the resistance to corrosion of the alloys by forming an oxide layer on the surfaces of the carriers. Such high temperature-induced oxidation may enhance the adherence of the refractory metal oxide support and catalytically promoting metal components to the carrier.

In alternative embodiments, one or more catalyst compositions may be deposited on an open cell foam substrate. Such substrates are well known in the art, and are typically formed of refractory ceramic or metallic materials.

Before describing several exemplary embodiments of the invention, it is to be understood that the invention is not limited to the details of construction or process steps set forth in the following description. The invention is capable of other embodiments and of being practiced in various ways. In the following, preferred designs are provided, including such combinations as recited used alone or in unlimited combinations, the uses for which include catalysts, systems, and methods of other aspects of the present invention.

Embodiments

Various embodiments are listed below. It will be understood that the embodiments listed below may be combined with all aspects and other embodiments in accordance with the scope of the invention.

Embodiment 1. A catalytic material comprising: a porous refractory metal oxide support having an average primary particle size of about 1 nm to about 100 nm as measured by Transmission Electron Microscopy (TEM); and a platinum group metal (PGM) component in nanoparticle form dispersed throughout the support; wherein an average primary particle size of the PGM component is about 10 nm to about 92 nm as measured by TEM.

Embodiment 2. The catalytic material of embodiment 1, wherein both the support and the PGM component are colloidally-delivered and the PGM is affixed to the support to form the catalytic material.

Embodiment 3. The catalytic material of either embodiment 1 or 2 that is effective for conversion of one or more components of an exhaust stream of an internal combustion engine.

Embodiment 4. The catalytic material of any of embodiments 1-3, wherein the platinum group metal component comprises platinum, palladium, rhodium, or combinations thereof and the catalytic material further optionally comprises a promoter and/or a stabilizer in an amount of about 0 to about 30% by weight based on the total weight of catalytic material.

Embodiment 5. The catalytic material of any of embodiments 1-4 having a BJH desorption average pore radius in the range of about 3 to about 20 nanometers as measured by nitrogen-pore size distribution ($N_2$-PSD).

Embodiment 6. The catalytic material of any of embodiments 1-5 having a BET surface area greater than or equal to about 30 $m^2/g$ as measured by nitrogen adsorption isotherm.

Embodiment 7. The catalytic material of any of embodiments 1-6, wherein after the fresh state catalytic material is calcined at 550° C. for two hours in air, the PGM nanoparticle average primary particle size remains in the range of from about 10 to about 92 nm as measured by Transmission Electron Microscopy (TEM).

Embodiment 8. The catalytic material of any of embodiments 4-7, wherein the promoter and/or the stabilizer is a rare earth oxide and is present in an amount of about 0.1 to about 30% by weight based on the total weight of catalytic material.

Embodiment 9. The catalytic material of embodiment 8, wherein the rare earth oxide comprises ceria, lanthana, neodymia, gadolinia, yttria, praseodymia, samaria, hafnia, or combinations thereof.

Embodiment 10. The catalytic material of any of embodiment 4-7, wherein the promoter and/or the stabilizer is an alkaline earth oxide and is present in an amount of about 0.1 to about 30% based on the total weight of catalytic material.

Embodiment 11. The catalytic material of embodiment 10, wherein the alkaline earth oxide comprises barium or strontium oxide, or combinations thereof.

Embodiment 12. The catalytic material of any of embodiments 1-11, wherein: the refractory metal oxide optionally comprises up to 30% of a promoter and/or a stabilizer; the catalytic material BJH desorption average pore radius is about 3 to about 30 nanometers as measured by nitrogen-pore size distribution ($N_2$-PSD); and the platinum group metal (PGM) component comprises colloidally-delivered palladium that is affixed to the support to form the catalytic material.

Embodiment 13. The catalytic material of embodiment 12 having a lower deactivation rate than a comparative catalytic material that comprises the PGM as delivered by a salt.

Embodiment 14. A catalyst composite for an exhaust stream of an internal combustion engine comprising: the catalytic material of any one of embodiments 1-13 coated onto a carrier.

Embodiment 15. The catalyst composite of embodiment 14 further comprising one or more additional platinum group metals and/or refractory metal oxide supports and/or promoters and/or stabilizers coated onto the carrier in the same or different layer as the catalytic material.

Embodiment 16. A system for treatment of an internal combustion engine exhaust stream including hydrocarbons, carbon monoxide, and other exhaust gas components, the emission treatment system comprising: an exhaust conduit in fluid communication with the internal combustion engine via an exhaust manifold; and the catalyst composite of embodiment 14 or 15.

Embodiment 17. A method for treating exhaust gases comprising contacting a gaseous stream comprising hydrocarbons, carbon monoxide, and nitrogen oxides with the catalyst composite of embodiment 14 or 15.

Embodiment 18. A method of making a catalytic material, the method comprising: (a) obtaining PGM nanoparticles; (b) obtaining nanoparticles of a refractory metal oxide support or a precursor of a refractory metal oxide support; and (c) preparing an aqueous colloidal solution of the PGM nanoparticles of step (a) and the nanoparticles of step (b) to form a catalytic material solution; and (d) drying and calcining the catalytic material solution of step (c) to form the catalytic material, wherein the PGM component is dispersed throughout the support and is thermally affixed to the support.

Embodiment 19. The method of embodiment 18, wherein step (a) comprises: forming an aqueous solution of a salt of a platinum group metal (PGM) component, a reducing agent, and a surfactant; mixing and heating the aqueous solution, thereby reducing at least a portion of the metal to a zero valance state by operation of the reducing agent in the presence of the surfactant, and forming an aqueous solution of colloidal PGM nanoparticles; and optionally, purifying and/or concentrating the nanoparticles.

Embodiment 20. The method of embodiment 19, wherein: the PGM comprises palladium, rhodium, or combinations thereof; the reducing agent comprises ascorbic acid; and the surfactant comprises polyvinylpyrrolidone (PVP).

Embodiment 21. The method of embodiment 19 or 20, wherein the reducing agent comprises: ascorbic acid ($C_6H_8O_6$), citric acid, sodium borohydride ($NaBH_4$), ethanol, propanol, diethylene glycol, and/or monoethylene glycol.

Embodiment 22. The method of any of embodiments 19-21, wherein the surfactant comprises: poly(vinylalcohol), poly(vinylpyrrolidone), poly(ethyleneimine), poly(acrylic acid), carbohydrates, and/or alkali metal citrates.

Embodiment 23. The method of any of embodiments 19-22, wherein upon calcination, the refractory metal oxide support comprises a high surface area gamma alumina having a surface area of at least about 60 square meters per gram ($m^2/g$) and optionally comprises up to about 30% of a promoter and/or a stabilizer that comprises a rare earth oxide.

Embodiment 24. The method of any of embodiments 19-23, wherein step (b) comprises obtaining a solution of nanoparticles of the refractory metal oxide support or obtaining a colloidal solution of a precursor of the refractory metal oxide support and further includes cooling and sonicating the colloidal solution of the refractory metal oxide support.

EXAMPLES

The following non-limiting examples shall serve to illustrate the various embodiments of the present invention.

Example 1.1 (Comparative)

Preparation of Pd Particles with Cubic Shape and an Average Primary Particle Size of 6.9 nm 11 mL of an aqueous solution containing 105 mg of poly(vinylpyrrolidone) (PVP, MW=55,000), 60 mg of ascorbic acid, 5 mg of KBr, and 185 mg of KCl were added to a vial and preheated to 80° C. in an oil bath under magnetic stirring for 10 minutes. Subsequently, 3 mL of an aqueous solution containing 57 mg of $Na_2PdCl_4$ was added with a pipet. The reaction was allowed to continue at 80° C. for 3 hours to produce an aqueous colloidal suspension of Pd nanoparticles. A product of Pd nanoparticles was collected by centrifugation.

To form a stock aqueous colloidal suspension of Pd cubic seeds for use in the preparation of Pd particles with octahedral shape and an average primary particle size of 13 nm (example 1.9), the product was washed with DI water two times and then dispersed in 11 mL of DI water (Suspension 1.1).

Figure 2:
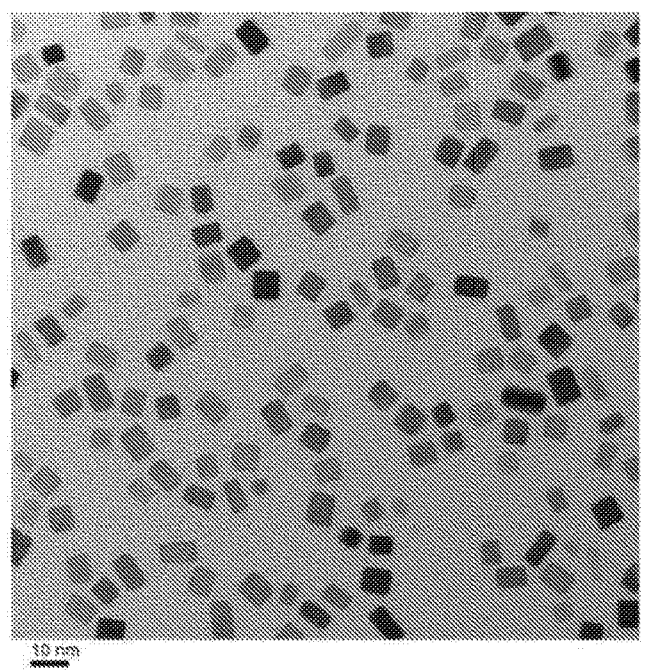

Several batches of the Pd nanoparticles were also combined. An average aggregate size of less than 500 nm was confirmed by dynamic light scattering. TEM images of prepared Pd particles are shown in FIGS. 1-2. An average primary particle size was calculated based on TEM images by measuring two sides of more than 50 particles. FIG. 1 provides a TEM image of the particles with a scale of 10 nm, where the average primary particle size was 6.9 nm. FIG. 2 provides a magnified view of FIG. 1.

Example 1.2

Preparation of Pd Particles with Cubic Shape and an Average Primary Particle Size of 10 nm 4 mL of an aqueous solution containing 52.5 mg of PVP (MW=55,000), 30 mg of ascorbic acid, and 150 mg of KBr were added to a vial and preheated to 80° C. in an oil bath under magnetic stirring for 20 minutes. Subsequently, 1.5 mL of an aqueous solution of $Na_2PdCl_4$ containing 10.3 mg Pd was added with a pipet. The reaction was allowed to continue at 80° C. for 3 hours to produce an aqueous colloidal suspension of Pd nanoparticles (Suspension 1.2). A product of Pd nanoparticles was collected by centrifugation and washed three times with water.

Figure 3:
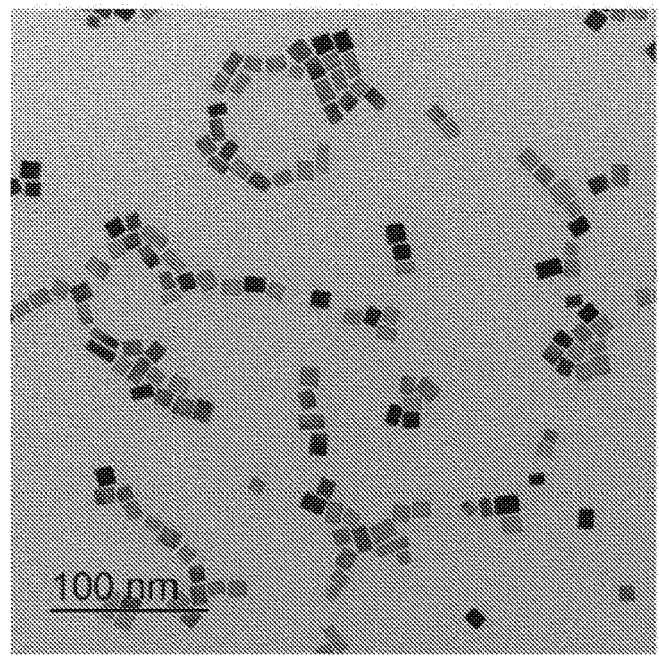
FIGS. 3-4 provide TEM images of the PGM nanoparticles of Example 1.2.
Figure 4:
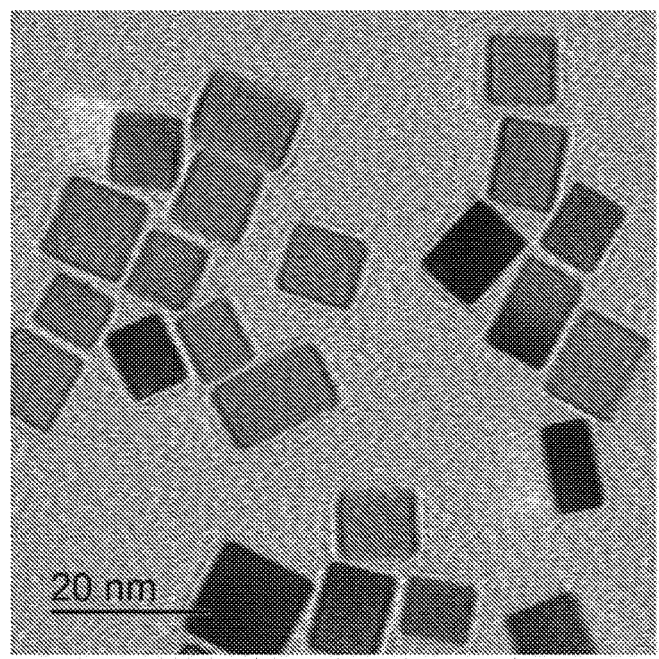

Several batches of the Pd nanoparticles were combined to form a stock colloidal solution for loading of Pd particles onto support. An average aggregate size of less than 500 nm was confirmed by dynamic light scattering. TEM images of prepared Pd-particles are shown in FIGS. 3-4. An average primary particle size was calculated based on TEM images by measuring two sides of more than 50 particles. FIG. 3 provides a TEM image of the particles with a scale of 200 nm, where the average primary particle size was 10 nm. FIG. 4 provides an image of particles of FIG. 3 with a scale of 20 nm.

Example 1.3

Figure 5:
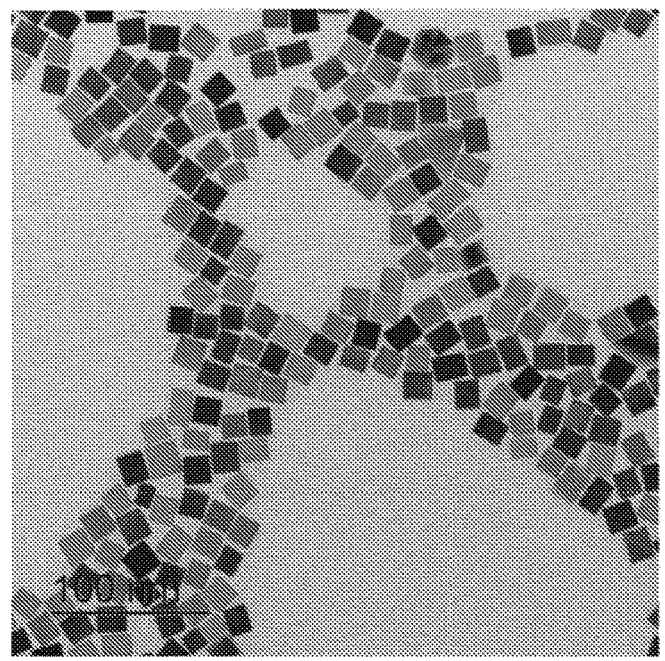
FIGS. 5-6 provide TEM images of the PGM nanoparticles of Example 1.3.
Figure 6:
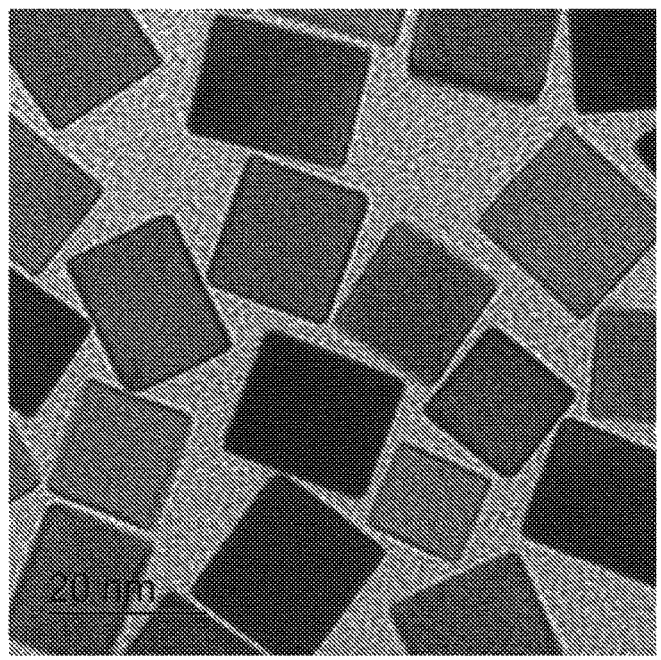

Preparation of Pd Particles with Cubic Shape and an Average Primary Particle Size of 16 nm 4 mL of an aqueous solution containing 52.5 mg of PVP (MW=55,000), 30 mg of ascorbic acid, and 300 mg of KBr were added to a vial and preheated to 80° C. in an oil bath under magnetic stirring for 20 minutes. Subsequently, 1.5 mL of an aqueous solution of $Na_2PdCl_4$ containing 10.3 mg Pd was added with a pipet. The reaction was allowed to continue at 80° C. for 3 hours to produce an aqueous colloidal suspension of Pd nanoparticles. A product of Pd nanoparticles was collected by centrifugation and washed three times with water. Several batches were combined to form a stock colloidal solution for loading of Pd particles onto support. An average aggregate size of less than 500 nm was confirmed by dynamic light scattering. TEM images of prepared Pd-particles are shown in FIGS. 5-6. An average primary particle size was calculated based on TEM images by measuring two sides of more than 50 particles. FIG. 5 provides a TEM image of the particles with a scale of 100 nm, where the average primary particle size was 16 nm. FIG. 6 provides an image of particles of FIG. 5 with a scale of 20 nm.

Example 1.4

Figure 7:
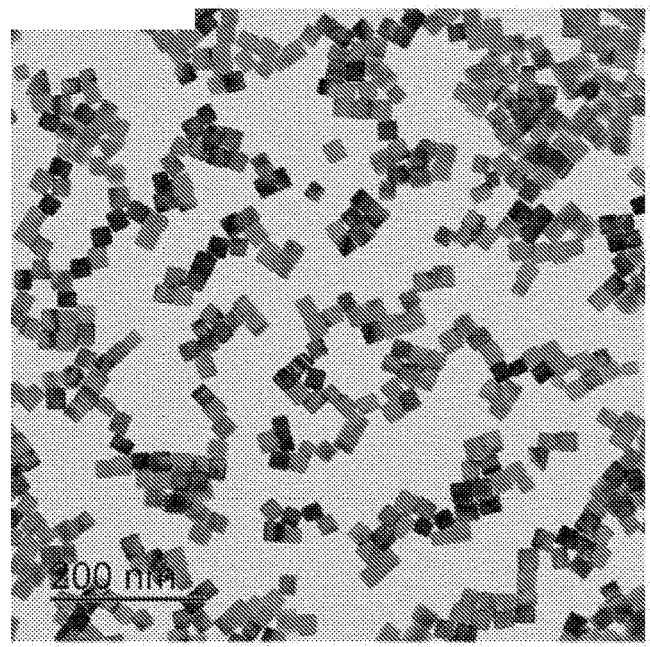
FIGS. 7-8 provide TEM images of the PGM nanoparticles of Example 1.4.
Figure 8:
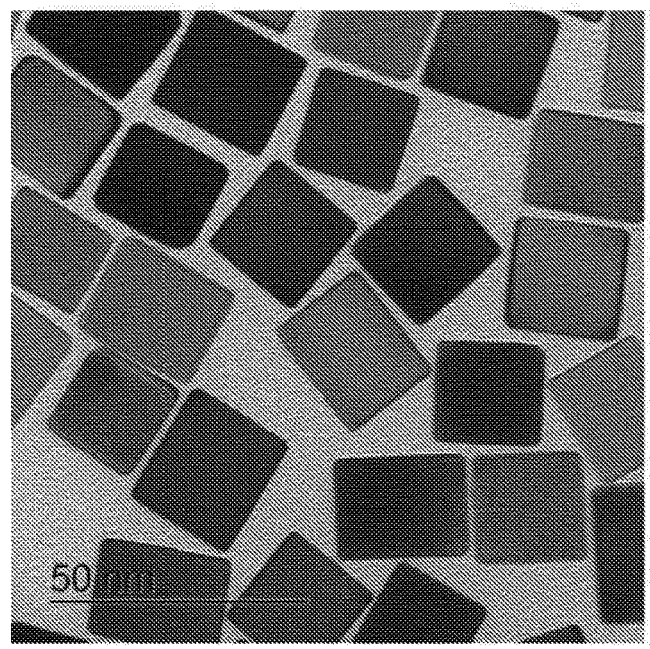

Preparation of Pd Particles with Cubic Shape and an Average Primary Particle Size of 25 nm 4 mL of an aqueous solution containing 52.5 mg of PVP (MW=55,000), 30 mg of ascorbic acid, 150 mg of KBr, and 3.853 mL of unwashed Suspension 1.2 containing 7.2 mg of Pd particles were added to a vial and preheated to 40° C. in an oil bath under magnetic stirring for 20 minutes. Subsequently, 1.5 mL of an aqueous solution of $Na_2PdCl_4$ containing 10.3 mg Pd was added with a pipet. The reaction was allowed to continue at 40° C. for 24 hours. Product of Pd nanoparticles was collected by centrifugation and washed three times with water. Several batches were combined to form a stock colloidal solution for loading of Pd particles onto support. An average aggregate size of less than 500 nm was confirmed by dynamic light scattering. TEM images of prepared Pd-particles are shown in FIGS. 7-8. An average primary particle size was calculated based on TEM images by measuring two sides of more than 50 particles. FIG. 7 provides a TEM image of the particles with a scale of 100 nm, where the average primary particle size was 25 nm. FIG. 8 provides an image of particles of FIG. 7 with a scale of 50 nm.

Example 1.5

Figure 9:
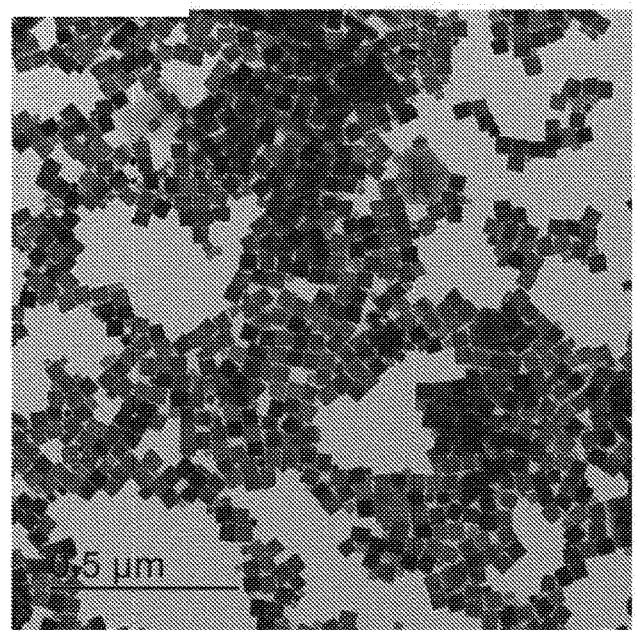
FIGS. 9-10 provide TEM images of the PGM nanoparticles of Example 1.5.
Figure 10:
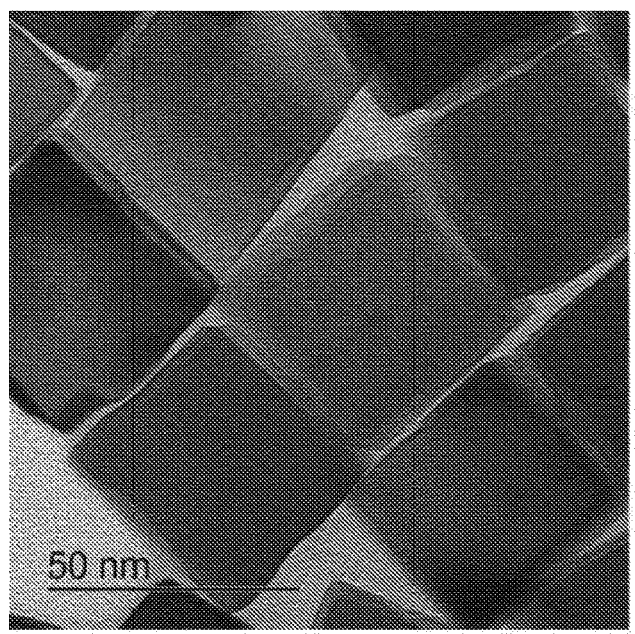

Preparation of Pd Particles with Cubic Shape and an Average Primary Particle Size of 47 nm 4 mL of an aqueous solution containing 52.5 mg of PVP (MW=55,000), 30 mg of ascorbic acid, 150 mg of KBr, and 0.317 mL of unwashed Suspension 1.2 containing 0.6 mg of Pd particles were added to a vial and preheated to 40° C. in an oil bath under magnetic stirring for 20 minutes. Subsequently, 1.5 mL of an aqueous solution of $Na_2PdCl_4$ containing 10.3 mg Pd was added with a pipet. The reaction was allowed to continue at 40° C. for 24 hours. A product of Pd nanoparticles was collected by centrifugation and washed three times with water. Several batches were combined to form a stock colloidal solution for loading of Pd particles onto support. An average aggregate size of less than 500 nm was confirmed by dynamic light scattering. TEM images of prepared Pd-particles are shown in FIGS. 9-10. An average primary particle size was calculated based on TEM images by measuring two sides of more than 50 particles. FIG. 9 provides a TEM image of the particles with a scale of 0.5 µm, where the average primary particle size was 47 nm. FIG. 10 provides an image of particles of FIG. 9 with a scale of 50 nm.

Example 1.6

Figure 11:
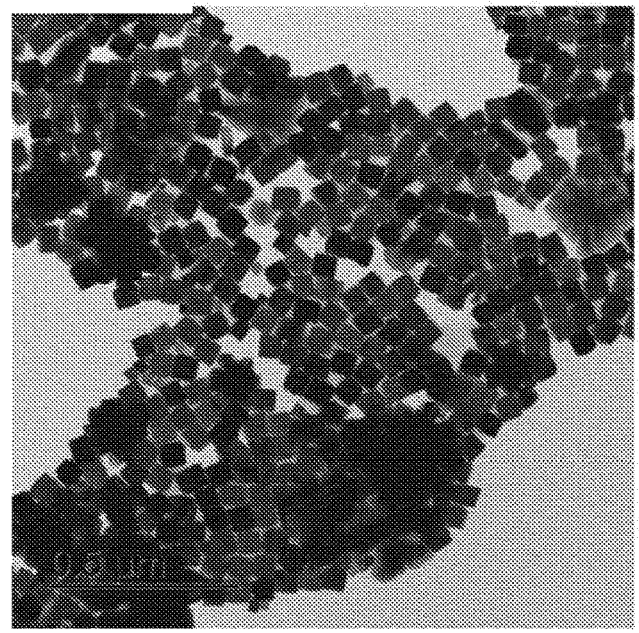
FIGS. 11-12 provide TEM images of the PGM nanoparticles of Example 1.6.
Figure 12:
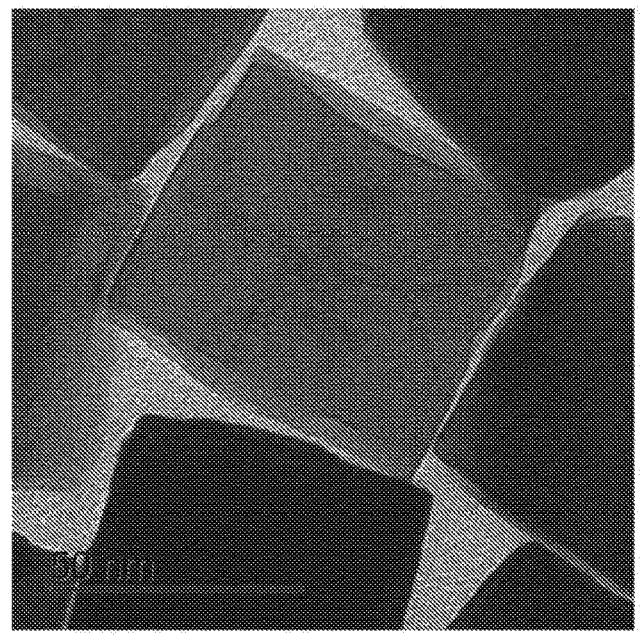

Preparation of Pd Particles with Cubic Shape and an Average Primary Particle Size of 70 nm 4 mL of an aqueous solution containing 52.5 mg of PVP (MW=55,000), 30 mg of ascorbic acid, 150 mg of KBr, and 0.091 mL of unwashed solution from example 1.2 containing 0.17 mg of Pd particles were added to a vial and preheated to 40° C. in an oil bath under magnetic stirring for 20 minutes. Subsequently, 1.5 mL of an aqueous solution of $Na_2PdCl_4$ containing 10.3 mg Pd was added with a pipet. The reaction was allowed to continue at 40° C. for 24 hours. A product of Pd nanoparticles was collected by centrifugation and washed three times with water. Several batches were combined to form a stock colloidal solution for loading of Pd particles onto support. An average aggregate size of less than 500 nm was confirmed by dynamic light scattering. TEM images of prepared Pd-particles are shown in FIGS. 11-12. An average primary particle size was calculated based on TEM images by measuring two sides of more than 50 particles. FIG. 11 provides a TEM image of the particles with a scale of 0.5 µm, where the average primary particle size was 70 nm. FIG. 12 provides an image of particles of FIG. 11 with a scale of 50 nm.

Example 1.7

Figure 13:
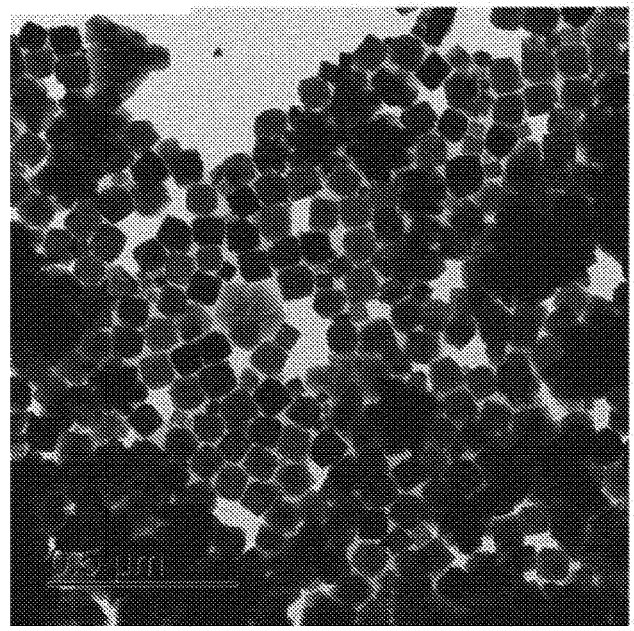
FIGS. 13-14 provide TEM images of the PGM nanoparticles of Example 1.7.
Figure 14:
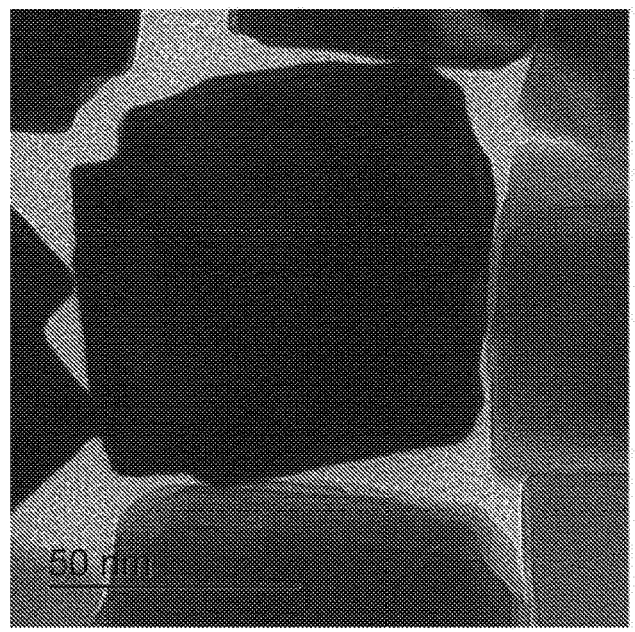

Preparation of Pd Particles with Cubic Shape and an Average Primary Particle Size of 92 nm 4 mL of an aqueous solution containing 52.5 mg of PVP (MW=55,000), 30 mg of ascorbic acid, 150 mg of KBr, and 0.038 mL of unwashed Suspension 1.2 containing 0.07 mg of Pd particles were added to a vial and preheated to 40° C. in an oil bath under magnetic stirring for 20 minutes. Subsequently, 1.5 mL of an aqueous solution of Na2PdCl4 containing 10.3 mg Pd was added with a pipet. The reaction was allowed to continue at 40° C. for 24 hours. A product of Pd nanoparticles was collected by centrifugation and washed three times with water. Several batches were combined to form a stock colloidal solution for loading of Pd particles onto support. An average aggregate size of less than 500 nm was confirmed by dynamic light scattering. TEM images of prepared Pd-particles are shown in FIGS. 13-14. An average primary particle size was calculated based on TEM images by measuring two sides of more than 50 particles. FIG. 13 provides a TEM image of the particles with a scale of 0.5

µm, where the average primary particle size was 92 nm. FIG. 14 provides an image of particles of FIG. 13 with a scale of 50 nm.

Example 1.8 (Comparative)

Figure 15:
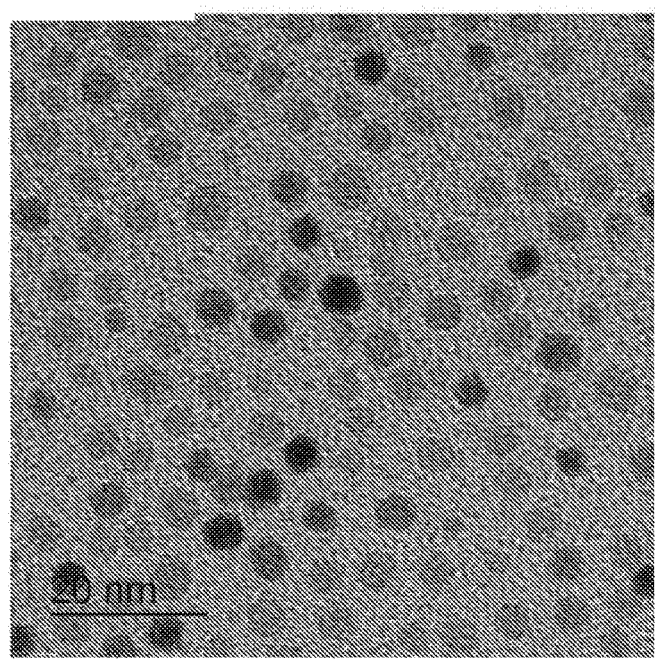
FIG. 15 provides a TEM image of the PGM nanoparticles of Example 1.8.

Preparation of Pd Particles with Cubooctahedral Shape and an Average Primary Particle Size of 4.5 nm 80 mL of an aqueous solution containing 1050 mg of PVP (MW=55,000) and 600 mg of ascorbic acid were added to a flask and preheated to 80° C. in an oil bath under magnetic stirring for 20 minutes. Subsequently, 30 mL of an aqueous solution containing 570 mg of Na2PdCl4 was added. The reaction was allowed to continue at 80° C. for 3 hours. A product of Pd nanoparticles was collected by dialysis against water. The final concentration of Pd is 1.45 mg/mL. An average aggregate size of less than 500 nm was confirmed by dynamic light scattering. TEM image of prepared Pd-particles is shown in FIG. 15. An average primary particle size was calculated based on TEM images by measuring diameter of more than 50 particles. FIG. 15 provides a TEM image of the particles with a scale of 20 nm, where the average primary particle size was 4.5 nm.

Example 1.9

Figure 16:
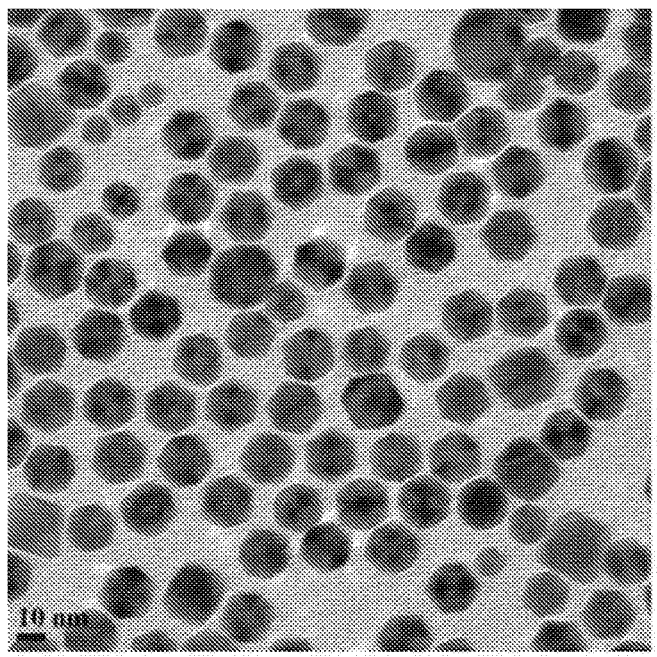
FIG. 16 provides a TEM image of the PGM nanoparticles of Example 1.9.

Preparation of Pd Particles with Icosohedral Shape and an Average Primary Particle Size of 17.6 nm 20 mL of ethylene glycol containing 300 mg of PVP (MW=55,000) was added to a flask and preheated to 160° C. in an oil bath under magnetic stirring for 20 minutes. $H_2PdCl_4$ was separately prepared by dissolving $PdCl_2$ in a mixture of ethylene glycol and 37% HCl, in which the molar ratio of HCl to $PdCl_2$ was set to 4/1 and the concentration of Pd(II) to 50 mM. Then, 10 mL of the $H_2PdCl_4$ solution (50 mM) was added into the vial in one shot. An amount of HCl was added to achieve a final concentration of 134 mM in the reaction mixture. The reaction was allowed to proceed at 160° C. for 3 hours. The product was collected by centrifugation and washed three times with water. Several batches were combined to form a stock colloidal solution for loading of Pd particles onto support. An average aggregate size of less than 500 nm was confirmed by dynamic light scattering. TEM image of prepared Pd-particles is shown in FIG. 16. An average primary particle size was calculated based on TEM images by measuring two sides of more than 50 particles. FIG. 16 provides a TEM image of the particles with a scale of 10 nm, where the average primary particle size was 17.6 nm.

Example 2.1, Example 2.8 (Comparative)

Preparation of Supported 2% $Pd/Al_2O_3$ Powder by Deposition of Pd-nanoparticles with a Size <8 nm from Examples 1.1 and 1.8 on Dispersible Boehmite Various supported 2% $Pd/Al_2O_3$ powders were prepared using Pd particles with a primary particle size <8 nm from Examples 1.1 or 1.8. The procedure was: 6.2 g of alumina precursor acid-dispersible boehmite alumina powder ($Al_2O_3$ content=79 wt. %) were dispersed in 50 mL water containing 0.1 mL acetic acid (pH 3-4) by stirring (10 minutes) and sonicated (30 minutes) in an ice-cooled bath to form a dispersion with an average aggregate size of 170 nm measured by dynamic light scattering. Then an aqueous colloidal solution containing 0.1 g Pd from Example 1.1 or 1.8 with an average aggregate size of less than 500 nm was added drop by drop under vigorous stirring. The pH of the final solution was in the range of 4-5. This solution was then sonicated for 30 minutes under ice-cooling. Subsequently, the solution was stirred at room temperature for 24 hours. Solvent water was removed by rotational evaporator at 50° C. The solid Pd/AlOOH was dried in an oven at 130° C. for ~1 hour. The solid was calcined at 550° C. for two hours in air resulting in the Pd—$Al_2O_3$ powder.

Examples 2.2-2.7

Figure 17:
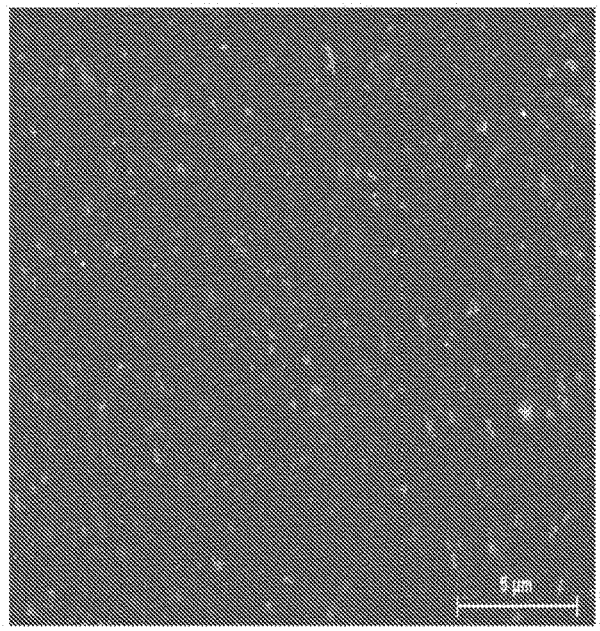
FIG. 17 provides a TEM image of the PGM nanoparticles of Example 2.4.
Figure 18:
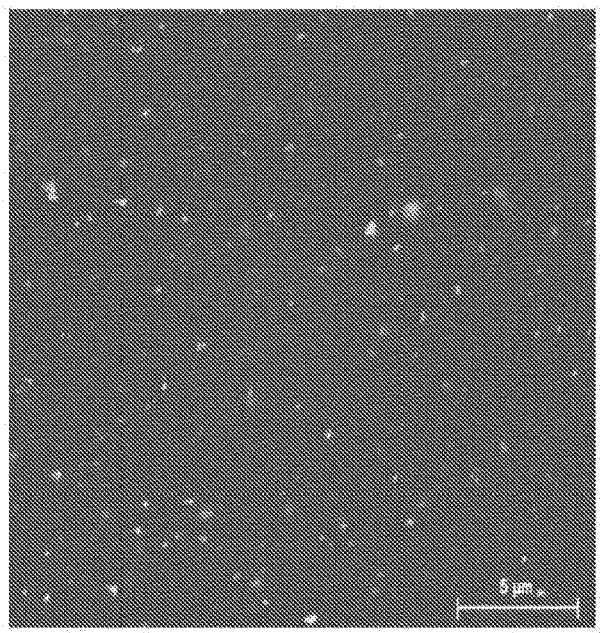
FIG. 18 provides a TEM image of the PGM nanoparticles of Example 2.5.
Figure 19:
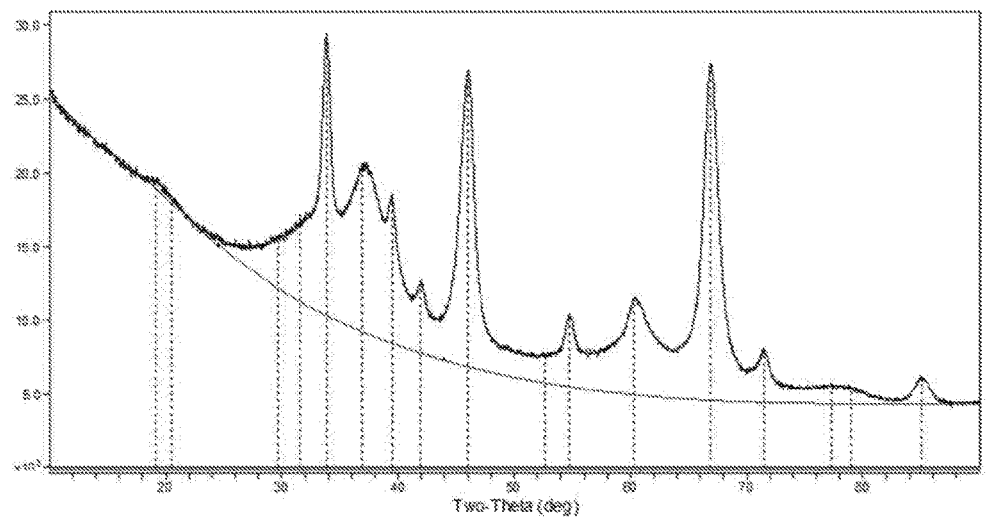
FIG. 19 provides XRD patterns of Example 2.2.
Figure 20:
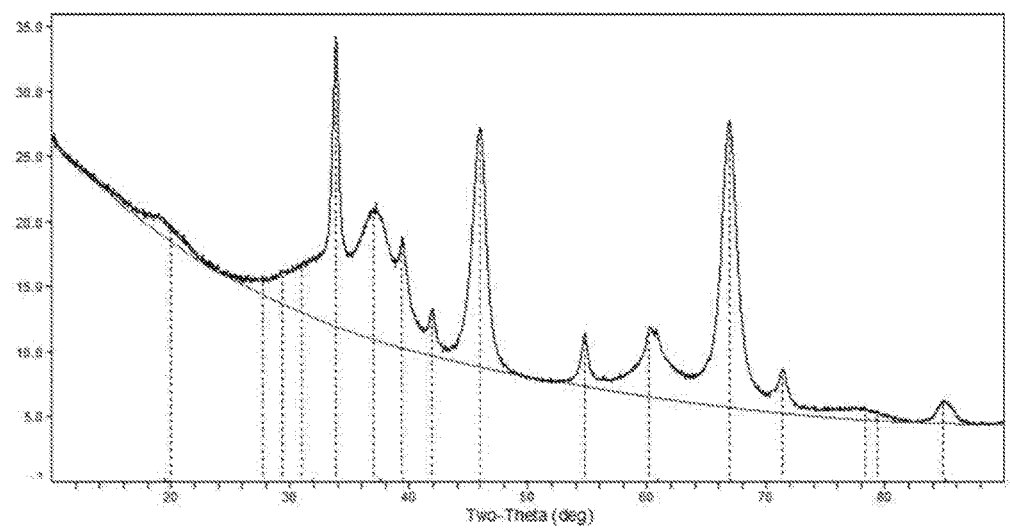
FIG. 20 provides XRD patterns of Example 2.4.

Preparation of 2% $Pd/Al_2O_3$ Powder by Deposition of Pd-nanoparticles with a Size from 10 to 92 nm from Examples 1.2-1.7, Respectively, on Dispersible Boehmite Preparation was similar to COMPARATIVE Examples 2.1 and 2.8 except that Pd particles with a size >8 nm from each of Examples 1.2 to 1.7 were used.
SEM image with a scale of 5 µm of prepared 2% $Pd/Al_2O_3$ powder according to Example 2.4 (25 nm Pd cubes on acid-dispersible boehmite) and post-calcined in air at 550° C. for 2 hours is shown in FIG. 17. SEM image with a scale of 5 µm of prepared 2% $Pd/Al_2O_3$ powder according to Example 2.5 (47 nm Pd cubes on acid-dispersible boehmite) post-calcined in air at 550° C. for 2 hours is shown in FIG. 18. FIGS. 17-18 provide evidence for a homogeneous distribution of Pd-particles through alumina support when both the support and the PGM component are colloidally-delivered.
XRD-patterns of powders prepared according to Examples 2.2 (10 nm Pd cubes deposited on acid-dispersible boehmite) and 2.4 (25 nm Pd cubes deposited on acid-dispersible boehmite) both after calcination in air at 550° C. for two hours are shown in FIGS. 19 and 20, respectively. FIGS. 19 and 20 provide evidence for a complete transition of acid-dispersible boehmite into γ-$Al_2O_3$ during calcination in air at 550° C. for two hours. Furthermore, FIGS. 19 and 20 provide evidence for oxidation of Pd into PdO during calcination in air at 550° C. for two hours.
BJH desorption average pore radius measured by nitrogen-pore size distribution ($N_2$-PSD) of powders prepared according to Examples 2.2 to 2.7 was in the range from 10 to 15 nm. BET surface area measured by nitrogen adsorption isotherm of powders prepared according to Examples 2.2 to 2.7 was in the range from 90 to 100 $m^2/g$. After hydrothermal aging at 1000° C. for 5 hours in a mixture of air and 10% by volume steam, BET surface area as measured by nitrogen adsorption isotherm of powders prepared according to Examples 2.2 to 2.7 was in the range from 70 to 80 $m^2/g$.

Example 2.9

Figure 21:
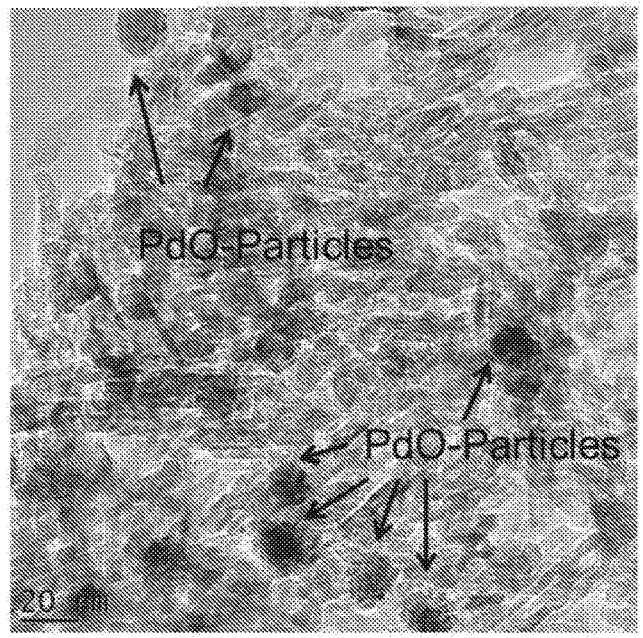
FIG. 21 provides a TEM image of the catalytic material of Example 2.9.

Preparation of 1.7% $Pd/Al_2O_3$ Powder by Deposition of Pd-nanoparticles with a Size of 17.6 nm from Example 1.9 on Dispersible Boehmite Preparation was similar to Examples 2.2-2.7 except that an aqueous colloidal solution with Pd icosohedra prepared according to Example 1.9 contained 0.085 g Pd.
TEM image with a scale of 20 nm of prepared 1.7% $Pd/Al_2O_3$ powder according to Example 2.9 (17.6 nm Pd icosohedra on acid-dispersible boehmite) post-calcined in air at 550° C. for 2 hours is shown in FIG. 21. An average particle size was calculated based on TEM images by measuring two sides of more than 50 particles. FIG. 21 provides a TEM image of the particles with the average particle size of 17 nm. The particles of FIG. 21 are substantially homogeneously dispersed throughout the support. Although the particle shape was changed during calcination in air at 550° C. for 2 hours, the particle size remained unchanged.

Example 3.1 (Comparative)

Preparation of 2% Pd/Al$_2$O$_3$ Powder by Deposition of Pd-nitrate on Pre-calcined Alumina A mixture of 7 g of an aqueous solution of Pd-nitrate (Pd-content of 28.57 wt. %) and 75 g of H$_2$O was impregnated on 100 g of pre-calcined gamma alumina (Al$_2$O$_3$ content=98 wt. %, BET surface area=150 m$^2$/g, BJH desorption average pore radius=10 nm). The impregnated powder was dried at 90° C. for 4 hours and calcined in air at 550° C. for two hours.

Example 3.2 (Comparative)

Preparation of 1.7% Pd/Al$_2$O$_3$ Powder by Deposition of Pd-nitrate on Pre-calcined Alumina A mixture of 5.95 g of an aqueous solution of Pd-nitrate (Pd-content of 28.57 wt. %) and 75 g of H$_2$O was impregnated on 100.3 g of pre-calcined gamma alumina (Al$_2$O$_3$ content=98 wt. %, BET surface area=150 m$^2$/g, BJH desorption average pore radius=10 nm). The impregnated powder was dried at 90° C. for 4 hours and calcined in air at 550° C. for two hours.

Example 4 (Comparative)

Figure 22:
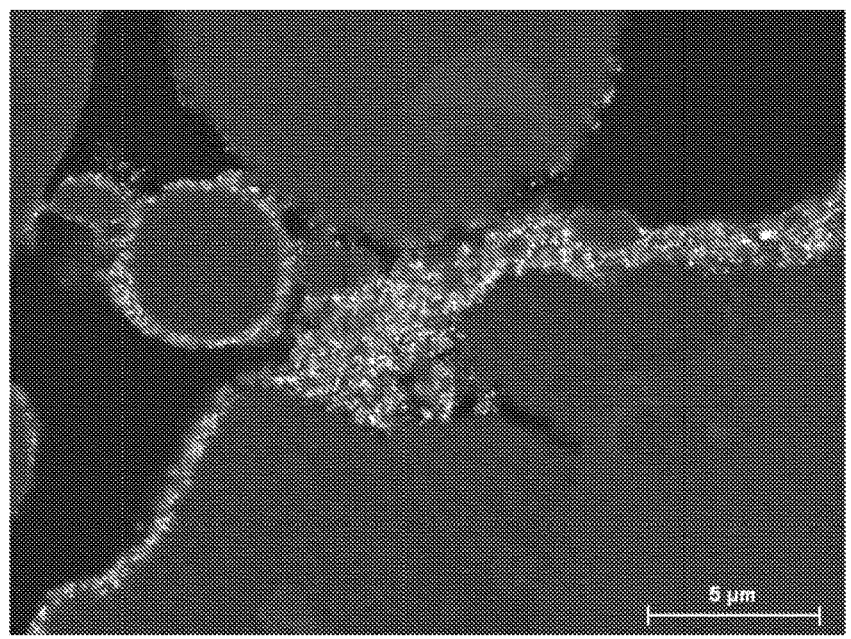
FIG. 22 provides a SEM image of the material of comparative Example 4.

Preparation of 2% Pd/Al$_2$O$_3$ Powder by Deposition of Pd-nanoparticles from Example 1.4 on Pre-calcined Alumina An aqueous colloidal solution containing 0.1 g Pd from one of the Example 1.4 was added to 5 g of pre-calcined gamma alumina (Al$_2$O$_3$ content=98 wt. %, BET surface area=150 m$^2$/g, BJH desorption average pore radius=10 nm). The resulting mixture was then sonicated for 30 minutes under ice-cooling. Solvent water was removed by rotational evaporator at 60° C. The resulting solid was dried in an oven at 130° C. for ~1 hour. The solid was calcined in air at 550° C. for two hours resulting in the Pd—Al$_2$O$_3$ powder. SEM image with a scale of 5 μm of prepared 2% Pd/Al$_2$O$_3$ powder according to Example 4 (25 nm Pd cubes on precalcined gamma alumina) is shown in FIG. 22. FIG. 22 provides evidence that Pd-particles are strongly agglomerated if support is precalcined alumina. That is, the particles reside primarily on the surface of the support and are not homogeneously dispersed throughout the support.

Example 5 (Comparative)

Preparation of 2% Pd/Al$_2$O$_3$ Powder by Deposition of Pd-nitrate on Dispersible Boehmite 62 g of acid-dispersible boehmite alumina powder (Al$_2$O$_3$ content=79 wt. %) were dispersed in 500 mL water containing 0.1 mL acetic acid (pH 3-4) by stirring (10 minutes) and sonication (30 minutes) to an average particle size of 170 nm. Then 3.5 g of an aqueous solution of Pd-nitrate (Pd-content of 28.57 wt. %) was added drop by drop under vigorous stirring. Solvent water was removed by rotational evaporator at 90° C. The powder was calcined in air at 550° C. for two hours resulting in the Pd—Al$_2$O$_3$ powder.

Example 6

Testing

TABLE 1

Table 1, below, provides a summary of prepared supported Pd/Al$_2$O$_3$ catalysts.

| | Pd-content | Pd component | Support precursor |
|---|---|---|---|
| Example 2.1 (COMPARATIVE) | 2 wt. % | 6.9 nm Pd cubes prepared according to Example 1.1 | acid-dispersible boehmite |
| Example 2.2 | 2 wt. % | 10 nm Pd cubes prepared according to Example 1.2 | acid-dispersible boehmite |
| Example 2.3 | 2 wt. % | 16 nm Pd cubes prepared according to Example 1.3 | acid-dispersible boehmite |
| Example 2.4 | 2 wt. % | 25 nm Pd cubes prepared according to Example 1.4 | acid-dispersible boehmite |
| Example 2.5 | 2 wt. % | 47 nm Pd cubes prepared according to Example 1.5 | acid-dispersible boehmite |
| Example 2.6 | 2 wt. % | 70 nm Pd cubes prepared according to Example 1.6 | acid-dispersible boehmite |
| Example 2.7 | 2 wt. % | 92 nm Pd cubes prepared according to Example 1.7 | acid-dispersible boehmite |
| Example 2.8 (COMPARATIVE) | 2 wt. % | 4.5 nm Pd cubooctahedra prepared according to Example 1.8 | acid-dispersible boehmite |
| Example 2.9 | 1.7 wt. % | 17.6 nm Pd icosohedra prepared according to Example 1.10 | acid-dispersible boehmite |
| Example 3.1 (COMPARATIVE) | 2 wt. % | Aqueous solution of Pd-nitrate | gamma Al$_2$O$_3$, S$_{BET}$ = 150 m$^2$/g, BJH pore radius = 10 nm |
| Example 3.2 (COMPARATIVE) | 1.7 wt. % | Aqueous solution of Pd-nitrate | gamma Al$_2$O$_3$, S$_{BET}$ = 150 m$^2$/g, BJH pore radius = 10 nm |
| Example 4 (COMPARATIVE) | 2 wt. % | 25 nm Pd cubes prepared according to Example 1.4 | gamma Al$_2$O$_3$, S$_{BET}$ = 150 m$^2$/g, BJH pore radius = 10 nm |
| Example 5 (COMPARATIVE) | 2 wt. % | Aqueous solution of Pd-nitrate | acid-dispersible boehmite |

Performance Testing for TWC Application
Shaping and Oven Aging Procedure:

Powder samples were set to slurry (approx. 30 wt. % solid content) and mixed with 3 wt. % boehmite dispersion as binder. After drying and calcination (1 h, 550° C. in air), the resulting cake was crushed and sieved to a particle size of 250-500 μm which is used for testing (fresh state).

For aging a fraction of the shaped powders was placed as shallow bed in a temperature resistant ceramic crucible. In a muffle oven the temperature was ramped up under a flow of air and 10% steam. After reaching the desired value of 1000° C. the temperature was kept constant for 5 h, then the heating was switched off (aged state).

Test Conditions:

Catalytic performance tests on fresh and aged powders were performed in a 48 fold screening reactor system using a gas mixture simulating exhaust conditions of a stoichiometrically operated gasoline engine.

100 mg of shaped powder (fresh or aged) was diluted with corundum of the same particle size to represent 1 mL of a coated catalyst with a typical washcoat loading and placed in the reactor. The samples were exposed to a feed gas with oscillating composition (1 s lean, 1 s rich) at a GHSV of 70000 h$^{-1}$ (normalized to 1 mL coated catalyst). Concentrations for the lean and rich mixture are given in Table 2, the average air/fuel ratio is adjusted to $\lambda=1$ (i.e. to stoichiometric air/fuel ratio). To estimate light-off temperatures, the samples were tested under stationary conditions at different discrete temperature levels (T=150, 175, 200, 225, 250, 275, 300, 325, 350, 375, 400, 425, 450° C.). At each temperature level the conversion was measured as an average value over a 30 s sampling time. The conversion vs. temperature curves were then interpolated using a local regression model and light-off temperatures ($T_{50}$–HC=temperature of 50% hydrocarbons conversion) were extracted from this interpolation. Catalyst deactivation is determined as a difference in 50% conversion temperatures in aged and fresh state ($\Delta(T_{50}$-HC$)=T_{50}$-HC$_{[aged]}$ $-T_{50}$-HC$_{[fresh]}$).

TABLE 2

Lean and rich feed composition in light-off tests with λ-perturbation

|  | Lean | Rich |
|---|---|---|
| CO [vol.-%] | 0.71 | 2.33 |
| H$_2$ [vol.-%] | 0.23 | 0.77 |
| O$_2$ [vol.-%] | 1.8 | 0.8 |
| HC (Propylene:Propane 2:1 or 3:1*) [ppmv C$_1$] | 3000 | 3000 |
| NO [ppmv] | 1500 | 1500 |
| CO$_2$ [vol.-%] | 14 | 14 |
| H$_2$O [vol.-%] | 10 | 10 |

*For the first set of samples (Pd cubes, 10-100 nm, Set I) a propylene:propane mixture of 3:1 was used. In later tests (Set II, III) the propylene:propane ratio was switched to 2:1.

Performance data are summarized in Table 3. Pd-particles with an average size in the range from 10 to 92 nm experienced much lower deactivation than reference materials containing Pd-particles with an average size in the range from 4.3 to 6.9 nm. Also Pd-particles with an average size in the range from 10 to 92 nm experienced much lower deactivation than reference materials prepared by impregnation of Pd-nitrate.

TABLE 3

Catalytic performance data of prepared supported Pd/Al$_2$O$_3$ catalysts.

| Pd/Al$_2$O$_3$ catalyst | $T_{50}$-HC$_{[fresh]}$ | $T_{50}$-HC$_{[aged]}$ | $\Delta(T_{50}$-HC) |
|---|---|---|---|
| Set I (propylene:propane ratio = 3:1) | | | |
| Example 2.2 | 268 | 272 | 4 |
| Example 2.3 | 271 | 273 | 2 |
| Example 2.4 | 270 | 275 | 5 |
| Example 2.5 | 299 | 287 | −12 |
| Example 2.6 | 304 | 293 | −11 |
| Example 2.7 | 294 | 295 | 1 |
| COMPARATIVE Example 3.1 | 224 | 270 | 46 |
| COMPARATIVE Example 5 | 223 | 271 | 48 |
| Set II (propylene:propane ratio = 2:1) | | | |
| Example 2.2 | 268 | 283 | 15 |
| COMPARATIVE Example 2.1 | 248 | 295 | 47 |
| COMPARATIVE Example 2.8 | 245 | 283 | 38 |
| COMPARATIVE Example 3.1 | 227 | 281 | 54 |
| Set III (propylene:propane ratio = 2:1) | | | |
| Example 2.9 | 241 | 268 | 27 |
| COMPARATIVE Example 3.2 | 242 | 280 | 38 |

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A catalytic material comprising:
   a porous refractory metal oxide support, wherein the support is in particulate form and has an average primary particle size of about 1 nm to about 100 nm as measured by Transmission Electron Microscopy (TEM); and
   a platinum group metal (PGM) component in nanoparticle form dispersed throughout the support;
   wherein the average primary particle size of the PGM component is about 10 nm to about 92 nm as measured by TEM, and
   wherein the catalytic material exhibits one or more of the following features:
   a) a BJH desorption average pore radius of about 3 to about 20 nanometers as measured by nitrogen-pore size distribution (N$_2$-PSD);
   b) a BET surface area greater than or equal to about 30 m$^2$/g as measured by nitrogen adsorption isotherm; and
   c) an aged PGM component average primary particle size that remains about 10 nm to about 92 nm as measured by Transmission Electron Microscopy (TEM) after calcination at 550° C. for two hours in air of the catalytic material starting in a fresh state.

2. The catalytic material of claim 1, wherein both the support and the PGM component are colloidally delivered and the PGM component is affixed to the support.

3. The catalytic material of claim 1, wherein the material is effective for conversion of one or more components of an exhaust stream of an internal combustion engine.

4. The catalytic material of claim 1, wherein the PGM component comprises platinum, palladium, rhodium, or combinations thereof.

5. The catalytic material of claim 1 having a BJH desorption average pore radius of about 3 to about 20 nanometers as measured by nitrogen-pore size distribution ($N_2$-PSD).

6. The catalytic material of claim 1 having a BET surface area greater than or equal to about 30 $m^2/g$ as measured by nitrogen adsorption isotherm.

7. The catalytic material of claim 1, wherein after calcination at 550° C. for two hours in air of the catalytic material starting in a fresh state, the PGM component average primary particle size remains about 10 nm to about 92 nm as measured by Transmission Electron Microscopy (TEM).

8. The catalytic material of claim 1, further comprising one or both of a promoter and stabilizer in an amount of about 0.1 to about 30% by weight based on the weight of the catalytic material.

9. The catalytic material of claim 8, wherein one or both of the promoter and stabilizer comprises a rare earth oxide selected from the group consisting of ceria, lanthana, neodymia, gadolinia, yttria, praseodymia, samaria, hafnia, and combinations thereof.

10. The catalytic material of claim 8, wherein one or both of the promoter and the stabilizer is an alkaline earth oxide selected from the group consisting of barium oxide, strontium oxide, or a combination thereof.

11. A catalytic material comprising:
   a porous refractory metal oxide support, wherein the support is in particulate form and has an average primary particle size of about 1 nm to about 100 nm as measured by Transmission Electron Microscopy (TEM); and
   a platinum group metal (PGM) component in nanoparticle form dispersed throughout the support,
   wherein the average primary particle size of the PGM component is about 10 nm to about 92 nm as measured by TEM, and
   wherein:
      the refractory metal oxide optionally comprises up to about 30% of a promoter, a stabilizer, or both a promoter and a stabilizer, and the catalytic material BJH desorption average pore radius is about 3 to about 30 nanometers as measured by nitrogen-pore size distribution ($N_2$-PSD); and
      the platinum group metal (PGM) component comprises colloidally-delivered palladium that is affixed to the support to form the catalytic material.

12. The catalytic material of claim 11 having a lower deactivation rate than a comparative catalytic material that comprises the PGM as delivered by a salt.

13. A catalyst composite for an exhaust stream of an internal combustion engine comprising: the catalytic material of claim 1 coated onto a carrier.

14. The catalyst composite of claim 13, further comprising one or more additional platinum group metals, refractory metal oxide supports, promoters, or stabilizers coated onto the carrier in the same layer or a different layer as the catalytic material.

15. A system for treatment of an internal combustion engine exhaust stream including hydrocarbons, carbon monoxide, and other exhaust gas components, the emission treatment system comprising:
   an exhaust conduit in fluid communication with the internal combustion engine via an exhaust manifold; and
   the catalyst composite of claim 13.

16. A method for treating exhaust gases comprising contacting a gaseous stream comprising hydrocarbons, carbon monoxide, and nitrogen oxides with the catalyst composite of claim 13.

17. A method of making a catalytic material, the method comprising:
   (a) obtaining PGM nanoparticles;
   (b) obtaining nanoparticles of a refractory metal oxide support or a precursor of a refractory metal oxide support;
   (c) preparing an aqueous colloidal solution of the PGM nanoparticles of step (a) and the nanoparticles of step (b) to form a catalytic material solution; and
   (d) drying and calcining the catalytic material solution of step (c) to form the catalytic material, wherein the PGM component is dispersed throughout the support and thermally affixed to the support, wherein step (a) comprises:
      forming an aqueous solution of a salt of a platinum group metal (PGM) component, a reducing agent, and a surfactant;
      mixing and heating the aqueous solution, thereby reducing at least a portion of the metal to a zero valance form by the reducing agent in the presence of the surfactant and forming an aqueous solution of colloidal PGM nanoparticles; and
      optionally, purifying and/or concentrating the nanoparticles,
      wherein the surfactant is selected from the group consisting of poly(vinylalcohol), poly(vinylpyrrolidone), poly(ethyleneimine), poly(acrylic acid), carbohydrates, alkali metal citrates, and combinations thereof.

18. The method of claim 17, wherein:
   the PGM component comprises palladium, rhodium, or combinations thereof;
   the reducing agent comprises ascorbic acid; and
   the surfactant comprises polyvinylpyrrolidone (PVP).

19. The method of claim 17, wherein the reducing agent is selected from the group consisting of ascorbic acid ($C_6H_8O_6$), citric acid, sodium borohydride ($NaBH_4$), ethanol, propanol, diethylene glycol, monoethylene glycol, and mixtures thereof.

20. The method of claim 17, wherein step (b) comprises obtaining a solution of nanoparticles of the refractory metal oxide support or obtaining a colloidal solution of a precursor of the refractory metal oxide support and further includes cooling and sonicating the colloidal solution of the refractory metal oxide support.

21. A method of making a catalytic material, the method comprising:
   (a) obtaining PGM nanoparticles;
   (b) obtaining nanoparticles of a refractory metal oxide support or a precursor of a refractory metal oxide support;
   (b) preparing an aqueous colloidal solution of the PGM nanoparticles of step (a) and the nanoparticles of step (b) to form a catalytic material solution; and (c) drying and calcining the catalytic material solution of step (c) to form the catalytic material, wherein the PGM component is dispersed throughout the support and thermally affixed to the support, wherein step (a) comprises:

forming an aqueous solution of a salt of a platinum group metal (PGM) component, a reducing agent, and a surfactant;

mixing and heating the aqueous solution, thereby reducing at least a portion of the metal to a zero valance form by the reducing agent in the presence of the surfactant and forming an aqueous solution of colloidal PGM nanoparticles; and optionally, purifying and/or concentrating the nanoparticles, and wherein upon calcination, the refractory metal oxide support comprises a high surface area gamma alumina having a surface area of at least about 60 square meters per gram ($m^2/g$).

* * * * *

UNITED STATES PATENT AND TRADEMARK OFFICE
CERTIFICATE OF CORRECTION

PATENT NO. : 10,201,804 B2
APPLICATION NO. : 15/546953
DATED : February 12, 2019
INVENTOR(S) : Andrey Karpov et al.

It is certified that error appears in the above-identified patent and that said Letters Patent is hereby corrected as shown below:

In the Claims

In Column 24, Claim 21, Line 65, delete "(b)" and insert --(c)--, therefor.

In Column 25, Claim 21, Line 1, delete "(c)" and insert --(d)--, therefor.

Signed and Sealed this
Sixteenth Day of April, 2019

Andrei Iancu
*Director of the United States Patent and Trademark Office*